US007002971B1

(12) United States Patent
Enns et al.

(10) Patent No.: US 7,002,971 B1
(45) Date of Patent: Feb. 21, 2006

(54) HIGH-SPEED INTERNET ACCESS SYSTEM

(75) Inventors: Frederick Enns, Menlo Park, CA (US); Eduardo J. Moura, San Jose, CA (US); Jan Maksymilian Gronski, Palo Alto, CA (US); Ramesh Neelmegh, Fremont, CA (US); Jong C. Kim, Sunnyvale, CA (US)

(73) Assignee: Hybrid Patents Incorporated, Fort Worth, TX (US)

( * ) Notice: Subject to any disclaimer, the term of this patent is extended or adjusted under 35 U.S.C. 154(b) by 772 days.

(21) Appl. No.: 09/610,357

(22) Filed: Jul. 5, 2000

Related U.S. Application Data

(62) Division of application No. 08/899,883, filed on Jul. 24, 1997, now Pat. No. 6,658,010.

(60) Provisional application No. 60/022,644, filed on Jul. 25, 1996.

(51) Int. Cl.
    *H04L 12/28* (2006.01)
(52) U.S. Cl. ...................................... 370/401; 709/217
(58) Field of Classification Search ................ 370/401, 370/402, 407, 235, 347, 348, 389, 252, 395.1, 370/395.53, 395.6, 395.31, 395.21, 229; 709/217, 218, 219
    See application file for complete search history.

(56) References Cited

U.S. PATENT DOCUMENTS

| 3,836,888 A | 9/1974 | Boenke et al. |
|---|---|---|
| 3,859,596 A | 1/1975 | Jannery et al. |
| 4,494,111 A | 1/1985 | Rocci et al. |
| 4,498,169 A | 2/1985 | Rozmus |
| 4,512,033 A | 4/1985 | Schrock |

(Continued)

OTHER PUBLICATIONS

Networking 92, 2$^{nd}$ Annual PI Meeting, New Orleans, Sep. 1-2, 1992.

(Continued)

*Primary Examiner*—Hassan Kizou
*Assistant Examiner*—Ricardo Pizarro
(74) *Attorney, Agent, or Firm*—Bromberg & Sunstein LLP

(57) ABSTRACT

An asymmetric network system manages bandwidth allocation and configuration of remote devices in a broadband network. A modular architecture of the system permits independent scalability of upstream and downstream capacity separately for each of the upstream and downstream physical paths. Allocation of downstream bandwidth to requesting devices is made according to bandwidth utilization by other devices, bandwidth demand by the requesting remote device, class or grade of service by the requesting remote device or bandwidth guaranteed to other remote devices. Configuration parameters remotely managed by the network include device addresses (global and local), transmission credit values, upstream channel assignment and upstream transmit power level. Further, management of device configuration profiles and bandwidth allocation occurs through control and response packets respectively generated by the network and the remote devices according to network operating software located at both ends. Control packets include poll packets that request, among other things, demand for an upstream transmission. Configuration packets instruct remote devices to assume an operational state or return status or statistical data. Response packets transmitted by the remote devices provide information to the network operations center for control purposes or to confirm the state of operation of remote devices, including channel operating statistics, errors, noise, etc. in order to remove or reallocate assigned upstream channels. Downloadable network operating software enables the network operator to upgrade remote operating software or to reconfigure the response profile of the remote devices. Account administration and usage reports are also generated. IP or ATM encapsulation, as well as forward error correction and encryption, are employed in the broadband network which may include an RF, satellite and cable medium with or without a telephony or router return path.

23 Claims, 11 Drawing Sheets

U.S. PATENT DOCUMENTS

| | | | |
|---|---|---|---|
| 4,528,663 A | | 7/1985 | Citta |
| 4,633,462 A | | 12/1986 | Stifle et al. |
| 4,868,795 A | | 9/1989 | McDavid et al. |
| 5,155,590 A | | 10/1992 | Beyer, II et al. |
| 5,488,413 A | | 1/1996 | Elder et al. |
| 5,586,121 A | * | 12/1996 | Moura et al. ............... 370/404 |
| 5,651,005 A | | 7/1997 | Kwok et al. |
| 5,675,732 A | * | 10/1997 | Majeti et al. ............... 709/235 |
| 5,805,586 A | * | 9/1998 | Perreault et al. ............ 370/346 |
| 5,864,672 A | * | 1/1999 | Bodeep et al. .............. 725/126 |
| 5,889,963 A | | 3/1999 | Gopal et al. |
| 5,946,322 A | * | 8/1999 | Moura et al. ............... 370/468 |
| 5,956,338 A | * | 9/1999 | Ghaibeh .................. 370/236.2 |
| 5,959,997 A | * | 9/1999 | Moura et al. ............... 370/404 |
| 6,005,850 A | * | 12/1999 | Moura et al. ............... 370/282 |
| 6,021,158 A | * | 2/2000 | Schurr et al. ............... 375/211 |
| 6,104,727 A | * | 8/2000 | Moura et al. ............... 370/468 |
| 6,169,728 B1 | * | 1/2001 | Perreault et al. ............ 370/235 |
| 6,275,497 B1 | * | 8/2001 | Varma et al. ............... 370/431 |
| 6,658,010 B1 | * | 12/2003 | Enns et al. ................. 370/401 |
| 6,785,288 B1 | * | 8/2004 | Enns et al. ................. 370/401 |

OTHER PUBLICATIONS

Networking 93, 3$^{rd}$ Annual Principal Investigators Meeting, Santa Rosa, California, Aug. 31-Sep. 2, 1993.

McNamara, R.P. and Morse, P.E., "MetroNet: An Overview of a CATV Regional Data Network," NCTA 31$^{st}$ Annual Convention & Exposition, May 3-5, 1982, Las Vegas.

McGarty, T.P. and Veith, R., "Hybrid Cable and Telephone Computer Communications," Compcon 83 Fall, Twenty-Fifth IEEE Computer Society International Conference, Arlington, VA.

McGinty, E., "Using Narrow Band Data Transmission as an Information Delivery System for CATV Applications," Cable 86, Dallas, Texas, Mar. 15-18, 1986, NCTA.

Feldmeir, D., "A High-Speed Packet-Switching Network for CATV Systems," IEEE Transactions on Consumer Electronics (Aug. 1985), No. 3.

Roberts, L., "Aloha Packet System With and Without Slots and Capture," Computer Communication Review, Apr. 1975, vol. 5, No. 2 (Association for Computing Machinery).

Stanwyck, D., "A Reference Architecture for Enhanced CATV Networks, A Presentation to IEEE 802.6 CATV Access Protocol Study Group," Mar. 7-11, 1994.

"Approved Minutes, Mar. 1994, IEEE P902.6 Working Group, Metropolitan Area Networks," West Palm Beach, Florida, Nov. 7-11, 1993.

Baran, P., "On Distributed Communications Networks," Reprinted from IEEE Transaction of the Professional Technical Group on Communications Systems, vol. CS-12. No. 1, Mar. 1964.

Sirazi, S., Thomas, W., Rossen, T., "Two-Way Cable System Using Residential Facilities—NCTA Referred," 1984 IEEE International Conference on Consumer Electronics, Jun. 6-8, 1984.

Abramson, N., "The Aloha System—Another Alternative for Computer Communications," AFIPS Conference Proceedings, vol. 37, 1970 Fall Joint Computer Conference, Nov. 17-19, 1970, Houston, Texas, AFIPS Press.

Estin, D.L., "Data Communications Via Cable Television Networks: Technical and Policy Considerations," May 1982, Massachusetts Institute of Technology Laboratory for Computer Science.

\* cited by examiner

The checksum data uses T = 10 RS code characterized by the generator polynomial:

$$G(x) = (x + a^{120})(x + a^{121})(x + a^{122})(x + a^{123}) \\ (x + a^{124})(x + a^{125})(x + a^{126})(x + a^{127}) \\ (x + a^{128})(x + a^{129})(x + a^{130})(x + a^{131}) \\ (x + a^{132})(x + a^{133})(x + a^{134})(x + a^{135}) \\ (x + a^{136})(x + a^{137})(x + a^{138})(x + a^{139})$$

using the primitive polynomial:

$P(x) = x^8 + x^7 + x^2 + x + 1$ and the primitive element $a = x$  (Note a = [alpha])

3/4 PUNCTURED CODING SYSTEM SHOWING THE CODES TRANSMITTED Cx(n)
AND THE CODES DELETED <Cx(n)>

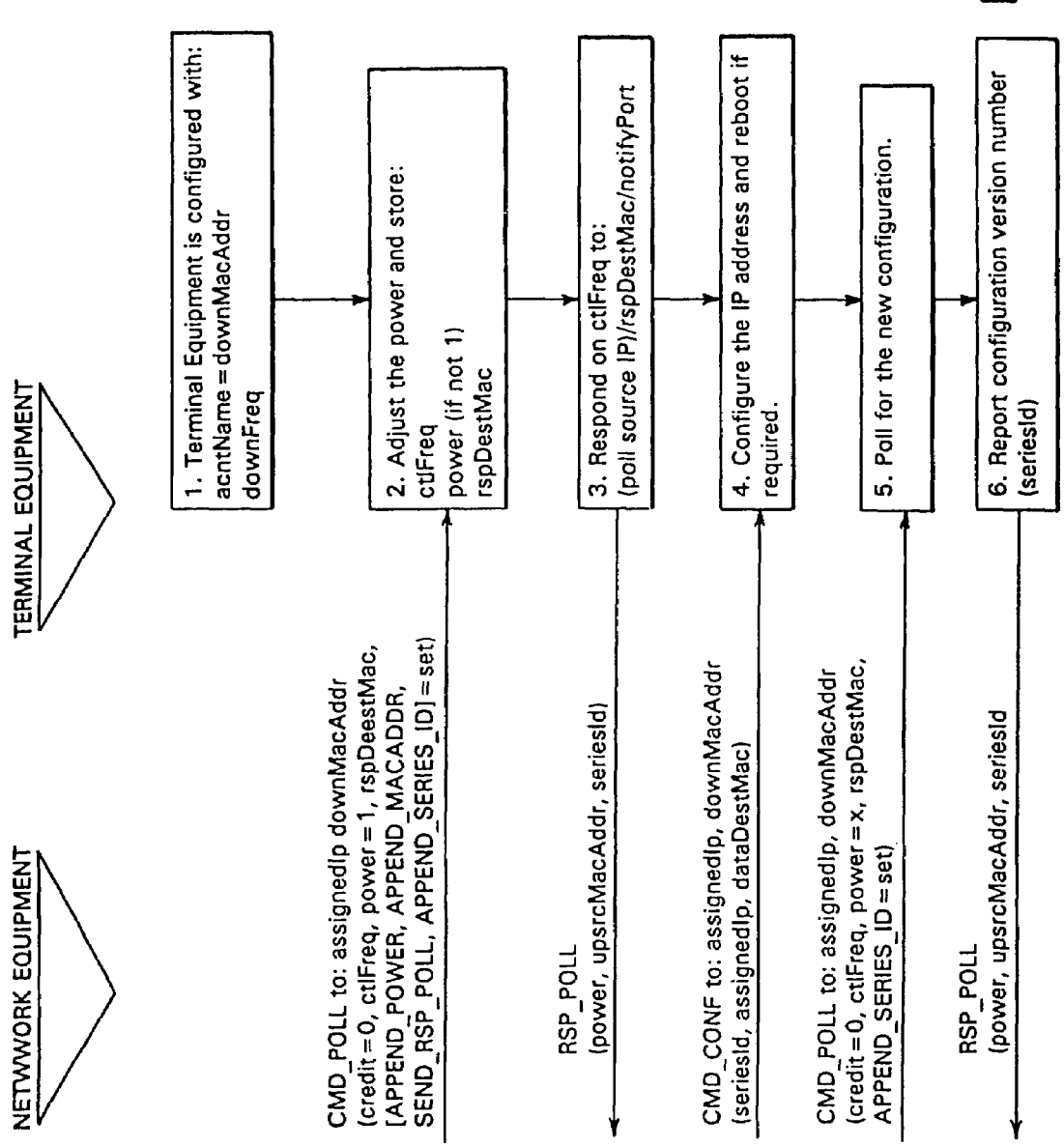

HIGH-SPEED INTERNET ACCESS SYSTEM

CROSS-REFERENCES TO RELATED APPLICATIONS

This application is a divisional of application Ser. No. 08/899,883 filed on Jul. 24, 1997, now U.S. Pat. No. 6,658,010 which is a continuation of provisional application No. 60/022,644 filed Jul. 25, 1996 titled "High Speed Internet Access System." The subject matter of U.S. Appl. No. 60/022,644 is expressly incorporated herein by reference.

This application is also related to U.S. Pat. No. 5,586,121 titled "Asymmetric Hybrid Access System", which issued on Dec. 17, 1996, and U.S. Pat. No. 5,347,304 titled "Remote Link Adapter for use in TV Broadcast Data Transmission System", which issued on Sep. 13, 1994 in the name of Eduardo J. Moura and James C. Long, for which re-issue application Ser. No. 08/340,733 was filed on Nov. 16, 1994. U.S. Pat. Nos. 5,586,121 and 5,347,304 are expressly incorporated herein by reference.

FIELD OF THE INVENTION

This invention pertains to a network management system that manages or controls data flow in an asymmetric network in which multiple users share a common broadband medium that conveys high speed data. More particularly, this invention is directed to a network management system for managing bandwidth and controlling configuration parameters, including those affecting channel assignment, bandwidth allocation, transmit power setting, address assignment and the like in an asymmetric network communication system.

BACKGROUND OF THE INVENTION

Medium access control provided by the present invention differs from contention-based and token-ring schemes in that a centralized network manager or controller regulates utilization of bandwidth by multiple remote devices connected to a shared medium rather than permitting the remote devices themselves to take control over the medium without prior authorization. Further, the present invention differs from asymmetric networks that are provided by dedicated ADSL networks in that multiple remote devices share a medium.

The invention has application to CATV broadband networks, wireless networks including cellular and satellite broadcast systems, television broadcast systems, hybrid/fiber coaxial networks, cable communication systems, and telephony systems in which at least a portion of the communication paths between communicating nodes is asymmetric. Nodes of the network include servers, host computers, network devices and appliances, RF and cable modems and computing devices. In particular, the invention is directed to methods, architectural structures, systems and components thereof useful for providing, facilitating and managing asymmetric communication using various switching or routing protocols, including ATM switching and IP routing, at various layers including the physical, link and network layers.

A primary objective of the present invention is to provide an architectural structure, control system and method for allocating bandwidth in an asymmetric network system.

Another objective of the present invention is to provide a method and system useful in an asymmetric network for managing configuration of remote devices.

A further objective of the present invention is to provide methods and systems for obtaining maximum bandwidth utilization by apportioning available bandwidth among multiple remote devices in an asymmetric network utilizing a shared medium.

A further objective of the present invention is to provide an architecture which permits independent scalability of upstream and downstream capacity in an asymmetric network system.

A further objective of the present invention is to provide a packet based control scheme for managing with a configuration of remote devices in an asymmetric network vacation system.

It is yet another objective of the present invention to provide thorough packet based control flexibility in assigning configuration parameters and bandwidth utilization through provision of a downloadable network operating software from a network management center to multiple remote devices.

It is yet a further objective of the present invention to provide methods and systems for collecting usage data and statistical operating parameters of the network which are subsequently used for bandwidth management and configuration control of remote devices.

It is yet a further object of of the present invention to provide methods and systems for altering transmit level, frequency or time slot channel assignments, global and local address assignments, account ID assignments and other properties of remote devices connected to a shared medium in asymmetric network.

It is yet a further object of the present invention to provide a management system which provides account administration for remote devices connected thereto.

SUMMARY OF THE INVENTION

In accordance with the invention, an asymmetric network management system, remote device or method involves the use of at least one downstream channel carried in a broadband transmission medium and at least one upstream channel operating in the same or different medium at a different speed or under a different protocol. The invention enables a host computer to transfer information with a plurality of remote devices over a shared broadband medium. A modular architecture of the network management system permits independent scalability of upstream and downstream capacity separately for each of the upstream and downstream physical paths, and a network manager in the system manages configuration parameters of the downstream bandwidth allocated to remote devices. The network manger effects allocation of downstream bandwidth to requesting devices according to bandwidth utilization by other devices, bandwidth demand by the requesting remote device, class or grade of service by the requesting remote device or bandwidth guaranteed to other remote devices. Configuration parameters remotely managed by the network manager include device addresses (global and local), transmission credit values, upstream channel assignments, upstream transmit power levels.

An additional aspect of the invention includes management of configuration and bandwidth through control and response packets generated at the network operations center and the remote devices, respectively. Control packets include poll packets that request, among other things, upstream transmission requests. Configuration packets instruct remote devices to assume an operational state, return status or statistical data. Response packets transmitted by the remote devices provide information to the network operation center for control purposes or to confirm their state of operation. Information packets are also sent in both directions. IP or ATM encapsulation, as well as forward error correction and encryption, are employed. The invention has application in broadband networks including RR, satellite and cable media, including those with telephony or router return paths.

These and other aspects, advantages and benefits of the invention will become more readily apparent in light of the succeeding disclosure and accompanying drawings. The invention, though, is pointed out with particularity by the appended claims.

BRIEF DESCRIPTION OF DRAWINGS

FIG. 5 illustrates the sequence of remote device initialization and configuration.

SUMMARY OF THE INVENTION

An asymmetric network is defined as a network communication system in which at least a portion of the respective upstream and downstream paths thereof operate at different speeds or under different protocols at the link or network layer to enable a host or server to communicate with remote users or client devices. The disclosed embodiments are described relative to a client-service network that permits high speed data services over cable, e.g., a hybrid fiber coaxial cable network of a CATV system, but the teachings herein have equal applicability to wireless data services including over-the-air TV and cellular broadcasts and direct broadcast satellite ("DBS") networks. The definition of asymmetry encompasses two-way wireless and cable systems having diverse channels or sub-channels, as well as telephone return cable and telephone return DBS systems. Conventionally, data is transmitted in fixed or variable length packets, but other data structures may be employed.

Because only a small percentage of existing cable networks support two-way data transmissions, the present invention also provides current CATV networks with a return by public switched telephone networks (POTS or ISDN) or by router.

Figure 1:
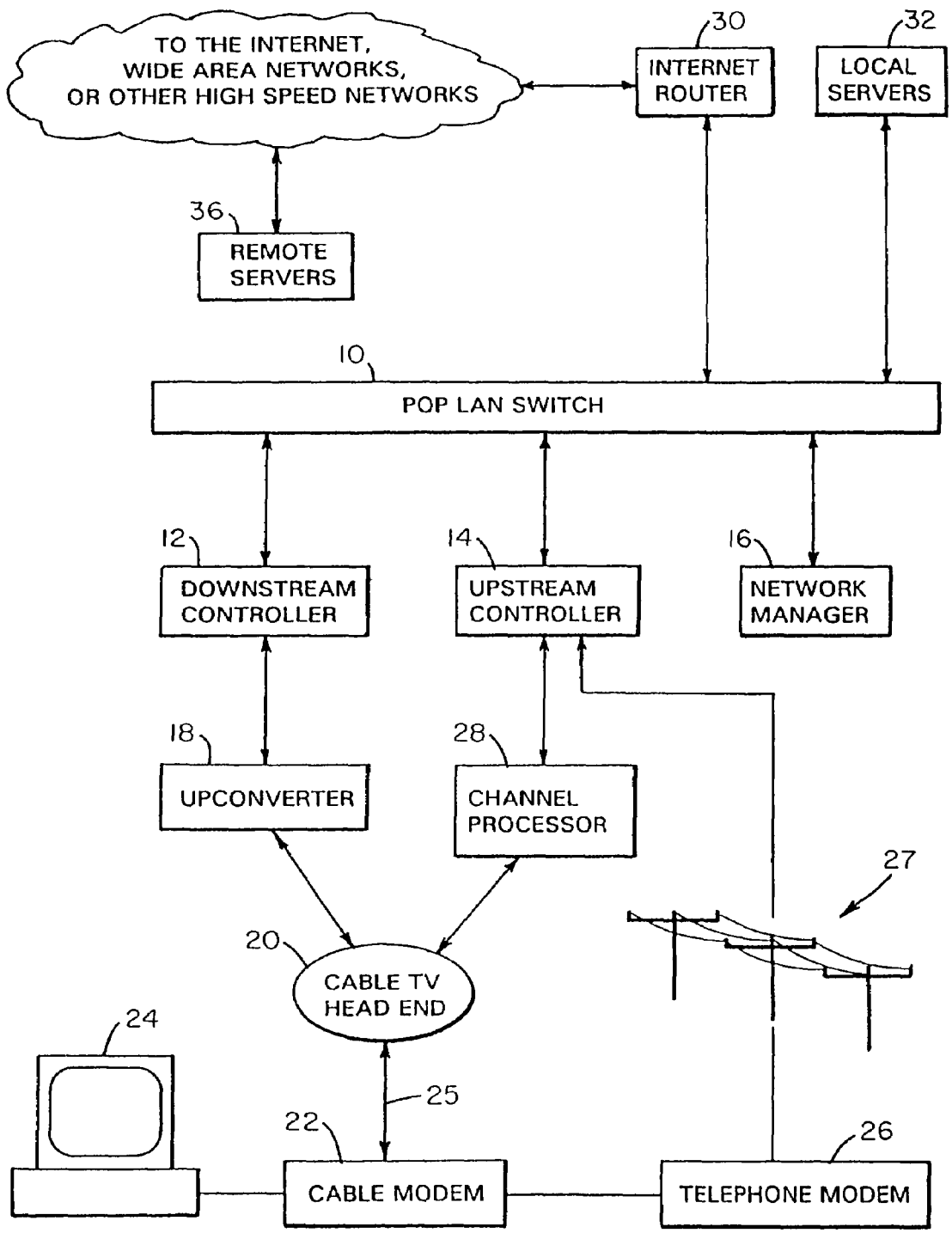
FIG. 1 depicts a layout of a preferred architectural structure of the invention including an independently operating network manager, upstream controller and downstream controller.

FIG. 1 shows a network management system (i.e., a hybrid access system) that uses an asymmetric high-speed broadband network to provide data services over cable. The system provides end users, including residences, small businesses and schools with high-speed network-to-user (downstream) connections coupled with lower speed user-to-network (upstream) connections. Such configuration allows users to take full advantage of a modern, two-way, hybrid fiber/coaxial (HFC) cable TV infrastructure and/or an existing telephone infrastructure. The asymmetric communication system provides a complete transport solution that allows NSP's to deliver to their customers high-speed access to the Internet, online services, telecommuting services or any other TCP/IP or ATM based application. The system provides an overall throughput of 30 Mbps for each 6 MHz TV channel in the downstream direction and operates from 128 Kbps to 2.048 Mbps in the upstream direction. The data rates specified herein obviously depend upon available bandwidth of operation.

The disclosed network management system provides a structural architecture and pathing configuration that permits independent scaling of capacity on the upstream and downstream physical, link or network layer. This allows a network service provider full control of cable data services that flow through the broadband network. A network operation center located at a centralized plant (i.e., a cable TV head end plant) controls configuration of remote devices; IP address assignments; upstream data rates; remote device power level settings and frequency assignments; user traffic management and load balancing; subscriber account management; routing or switching management; bandwidth management; and developing usage and performance statistics for modifying parameters that control such functions. The system also allows connections to other support and high speed networks.

The system uses standard CATV equipment such as television modulators, encoders, demodulators and channel processors for managing the upstream and downstream data channels. Signals upconverted by the downstream controller are mixed with other channels and transmitted to remote users via cable, first to the headend, and then to the remote users. Forward error correction techniques are employed in the transmission of signals to ensure that data integrity is maintained over a range of cable systems with varying quality. The head end equipment shifts the downstream channel frequency to the cable channel frequency that has been chosen for service by the remote sites. The head end also mixes to downstream signal with TV channels in the roll-off portion of the spectrum on the outgoing fiber link. The fiber cable carries the signal to neighborhood communities or businesses where they are converted to a coaxial cable signal. A conventional television cable splitter is used at the terminal and to provide access for television entertainment services as well as data services to one more PCs.

Independent Scalabililty

The head end components of the network include a POP LAN switch 10 that provides intercommunication services for a downstream controller 12, and upstream controller 14 and a network controller 16. Modularity of components and independent upstream and downstream controller provides scalability of the respective upstream and downstream channels at the network, link and physical layers. Providing independently operating downstream and upstream controllers 14 and 12, for example, facilitates matching equipment of a given capacity with desired traffic loads independently in each direction of an asymmetric broadband network. In the preferred physical arrangement, separate hardware racks or separated rack-mounted components are used to establish independent operation and control of the respective asymmetric paths. Each controller has its own operating system and either may be serviced without affecting the operations of the other. Separation may also be achieved by partitioned operation routines in a network operating system which control respective groups of upstream and downstream interface cards that handle asymmetric traffic.

Downstream bandwidth can be added independently from upstream bandwidth without affecting the other, and vice versa, simply by modifying or enhancing one of the components. Above all, the network management system is optimized for heavy download and constant bit rate traffic transfers—including digital video, data and voice—by the very nature of its asymmetric architecture. The pop LAN switch 10 shares an industry standard multi-gigabit backplane switching hub with interface modules for Ethernet (10BaseT), fast Ethernet (100 BaseT), TCP/IP router, T-1 CSU/DSU and ATM Sonet. The pop LAN switch 10 acts like a bridge to provide a single high bandwidth Ethernet fabric that connects to all routers, ATM switching networks, servers, controllers or other network components.

Downstream controller 12 conveys high-speed data via a broadband communication signal that is supplied upconverter module 18, which in turn, supplies the communication signal to a hybrid fiber coaxial system of cable TV head end 20. In the preferred structure, controller 12 is an Intel or Sun-based microprocessor that provides channel service through routing or switching of downstream traffic from a server (local or remote) to a remote user or device. The upconverter module 18 includes encoders and modulators for converting digital data from the downstream controller 12 into a form suitable for transmission over the CATV or wireless network, as the case may be. Several modulation schemes may be employed by upconverter module 18, as known in the art. In the embodiment constructed by the inventors, both QAM and VSB modulation techniques have been used. Assignee has also employed a technique known as VQM (vestigial quadrature modulation) which is a special form of vestigial sideband modulation to place digital data in a standard television signal without disturbing picture quality. This is described in assignee's co-pending application Ser. No. 08/820,347 filed Mar. 12, 1997 in the name of William C. Levan for Network System Using TV Channel TV Data Transmission Scheme, which is expressly incorporated herein by reference.

Continuing to describe the downstream path, hybrid fiber coaxial infrastructure of cable TV head end 20 supplies a television or other broadband signal to a client cable modem, such as remote device 22. Device 22 includes a detector and demodulator for detecting and thereafter converting the broadband signal into a digital data stream. It too is microprocessor-based and includes operating software for performing a multitude of functions, including DES decryption, herein described. Once the appropriate data is detected, device 22 utilizes an Ethernet interface to connect with and supply data to a computing device 24.

The path of upstream data emanating from PC 24 is returned to the host or server either through the same cabling infrastructure of cable TV head end 20, or alternatively, via a telephone link as illustrated by the telephone return path in FIG. 1. In the case of cable return, the cable modem 22, through its API interface with data processor 24, develops return data signals at an assigned frequency that differs from the frequency of the broadband signal in the downstream path. The upstream signal is then transferred over the same cabling infrastructure used for the downstream path. Thus, upstream and downstream signals share the same cable 25 that pass signals through the hybrid fiber coaxial network of cable TV head end 20. As known in the art, channel splitters, CSUs and DSUs are employed in the cabling network to provide independent upstream and downstream channels. A channel processor 28 reconverts the analog RF signals from the cable modem 22 into a digital data stream, and supplies the same to the upstream controller 14. Channel processor 28 is designed to process multiple upstream channels from multiple fiber nodes. Also, the upstream channels may have data rates that accommodate multiple types of service desired by the remote user 24, such as, text, graphics, voice, video, teleconferencing, or other type of service, transmitted at either constant or variable bit rates.

Once the upstream controller 14 receives the data from the channel processor, it routes or switches the same to the POP LAN switch 10 for transfer to its intended destination. In the case of IP packets, POP LAN switch routes data packets according to destination addresses contained in the packet. In the case of ATM packets, virtual paths are established for temporary connections between a source and destination. As indicated earlier, the controller 14 and/or network manager 16 provides a multitude of functions relative to configuration, frequency and bandwidth management, etc., so some of the packets transmitted by the remote devices 22 of 24 may be directed to the controller 14 instead of other devices in the network.

In the case of telephone return cable system, a telephone modem 26 (which may reside as the existing telephone modem card in computing device 24) develops return data signals in accordance with conventional modem communication protocols, and conveys the same over telephone lines to a modem bank in the upstream controller 14. As disclosed in assignee's co-pending grandparent application Ser. No. 08/426,920 (now U.S. Pat. No. 5,586,121), incorporated herein, the modem return path may proceed directly to a host or server providing interactive two-way communication with the processor device 24.

Still referring to FIG. 1, POP LAN switch 10 couples an Internet router 30 and local servers 32 residing at the cable TV head end or wireless broadcast facility. Router 30 provides connectivity to remote servers or other local or wide area networks. Network controller 16, in the preferred embodiment, controls, monitors, and prioritizes data flowing to and from the PC 24. Communication occurring between the remote subscribers and a host located at the head end facility or other site occurs via packets. Downstream data packets are sent to the remote devices in the form of TCP, UDP or ICMP IP packets. These packets may be encapsulated to transmit them according to ATM or any other switching or routing protocol. Packets sent to a remote device include a destination MAC address, a broadcast address or a multicast address. They also include an IP source address, network address or any other globally or locally assigned address.

Packet-Based Control and Reporting

Advantageously, bandwidth and configuration management is achieved through transfer of numerous parameters contained in control packets that originate from the network management system and/or response packets that originate from the remote devices. Since the network management system is functionally modular, such management may be implemented by any one of the independent downstream controller 12, upstream controller 14 or the network controller 16. Packet-based control permits assignment and removal of upstream channels depending on their operability status, frequency assignments, grade of service or bandwidth assignment, authorization requests, account administration and a multitude of other functions described herein.

Moreover, channel usage and operability statistics are collected by components of the system and reported to other components to effectuate bandwidth management and configuration control. For example, the upstream controller's DSP collects channel quality data that is used by a configuration manager to remove or reassign upstream channels. Remote devices report their bandwidth demand requirements to the upstream controller which is used by the network manager for assigning downstream bandwidth over a shared medium or channel. Surplus spectrum allocated to idle remote devices may be reallocated to active remote devices requiring more capacity. Channels having poor transfer quality may be removed. Loads may be balanced between different physical media. Devices may be switched to a different link, network or transport layer.

Respective control words, flags or nibbles contained in the control and response packets enable the network management system to perform these functions. Because network operating software in the remote devices may be downloaded from the network management system, their operation may be altered by re-configuring control packets to vary control and sensing functions effected by the control and/or response packets. As evident, management and control by such packets provide substantial flexibility in the management system. Appendices A through E describe various types of control information contained in control and response packets and the functions they provide.

Header information in control packets originating at the network management system includes a destination MAC address, a source IP address, a destination IP address, an IP type field, a UDP source port and a UDP destination port (port 473 in the preferred embodiment). Data values for control parameters follow this header. The header of response packets from the remote devices additionally includes a source MAC address. These packets have a variable format that consists of a fixed header followed by a variable length data field made up of operation units. In a conventional manner, the remote devices parse each command contained in a packet, and execute the commands that appear in the control packet based on the value assigned to parameters according to network operations software running in the remote device 22. The value of variables or parameters contained in the control packets may effect assignment of an address (global or local), assignment or change of an upstream transmit frequency, a change transmit power level setting, switching to another channel, issuance of transmission credits, ATM switching or pathing control or alteration of a polling status from one priority to another. Effectuation of other network management options is self-evident from the parameters and corresponding explanation set forth in Appendices A through E.

In a conventional manner as known in the art, a microprocessor in the remote device 22 places the control or status information in a register or memory location, and thereafter executes instructions of operating software in accordance with flag bits and information contained in the register or memory location. In addition, statistical traffic information may be accumulated by any component of the network operations center or the remote device to facilitate the control and management functions. Functions of the remote device 22 may also be performed by or reside in the client processor 24. Functions of a telephone modem 26 and RF modem device 22 may be combined in the remote client processor 24.

In particular, Appendix A describes the various fields (or entries) in a credit packet and their respective control functions that originate at the network management system (e.g., the upstream controller). A credit packet is used to issue transmission credits to a remote device authorizing it to transfer a given amount of information. The remote device, after transfer, responds with a DONE message (described later). In the preferred structure, upstream channel control is achieved by a polling mechanism through credit packets, CMD_CREDIT transmitted over the broadband downstream channel. Each credit packet is addressed to a specific remote device 22 (or 24) and contains a credit to transmit a specific number of packets on a particular upstream channel.

There are two types of credits that can be received by a remote device, limited and unlimited. The limited credit packet contains a credit value less than the maximum allowed credit (0xffff). An unlimited credit is given when a credit packet is received with a credit value of (0xffff). Certain values of certain parameters, as noted herein, provide status control or configuration control. As seen in the packet structure defined by Appendix A, the length of a control and status parameter may vary from a nibble, byte, single or double word (real or integer), or from one bit to about 80 or more bits. Certain address information or remote identification indicia is burned-in the remote device.

Appendix B identifies the various fields of a poll packet together with describing the respective control functions associated therewith. Poll packets are used, among other things, for detecting the transfer request status of remote devices. In operation, the network management system issues a CMD_POLL packet instead of a CMD_CREDIT packet in some situations. The CMD_POLL packet has the same format as the CMD_CREDIT packet. The remote device cannot distinguish between the two packets with the exception of the type of response it is to make. The remote device treats the CMD_POLL packet as a CMD_CREDIT packet except that it will return an RSP_POLL packet (to report status) instead of an RSP_DONE packet (to report an information transfer and/or an amount of remaining information to transfer).

Appendix C specifies the respective fields or entries, and control functions thereof, of a subscriber address configuration packet format. The subscriber address configuration packet, CMD_CONF, configures the IP address and data-DestMac address of the remote device 22 (or 24). The remote device uses the IP address, "assigned IP," to configure the downstream MAC address. For example, if the decimal IP address is 128.9. 0.32, the remote device converts each decimal field to a hexadecimal number to obtain the locally administered MAC address: 0x02:00:80:09:00:20. A complete configuration message may be split into several CMD_CONF packets.

Appendix D identifies respective fields and entries, and the respective control functions, of one type of response packet that is transmitted by the remote device. As indicated earlier, only two types of upstream packets may be transmitted by the remote device 22 or 24. This includes subscriber data packets and response packets. Subscriber data packets can be TCP, UDP or ICMP IP packets. These packets may be ATM-encapsulated and are sent to the data destination MAC address specified in the packet. On the other hand, response packets include RSP_DONE and RSP_POLL packets which are solicited by the network management system. The remote device transmits upstream packets on an assigned channel. In particular, the remote device transmits a solicited RSP_DONE packet of Appendix D whenever it receives a CMD_CREDIT packet with the SEND_DONE flag set. The remote device also periodically transmits a solicited RSP_DONE packet of the type shown in appendix D when it receives an unlimited credit. Remote devices do not encrypt RSP_DONE packets.

The Poll Response Packet of Appendix E identifies the various fields in respective control portions of a poll response packet which has attributes similar to the packet described in Appendix D, explained above.

Network Management System

The downstream controller 12 (FIG. 2) routes packets downstream; collects, stores and forwards traffic statistics; manages downstream bandwidth; encapsulates packets in the data link layer envelope; scrambles the data; and adds forward error correction. Controller 12 supports an integrated, internal 64 QAM modulator card 42 or an external 64 QAM modulator. The QAM modulators provide encrypted data rates of the 10 Mbps and occupies 2 MHz of bandwidth of a 6 MHz TV channel. The TV channel may accommodate three 10 Mbps channels. Dividing the downstream bandwidth into multiple broadband channel advantageously increase noise immunity (i.e., each band is affected differently by noise) and provide alternative paths should one sub-channel fail. In the preferred structure, each downstream controller 12 is configured to support up to six independent downstream channels. The number of channels, of course, is a matter of design choice. The downstream router 12 connects to the pop LAN switch 10 via a standard Ethernet 100 BaseT port 40.

The downstream controller encodes Ethernet packets from the POP LAN hub 10 and produces a QAM-modulated broadband RF downstream signal suitable for transmission over a cable network. The signal is then converted via converters 44 to, for example, one volt peak-to-peak baseband video signals for supply to the broadcast amplifiers for transmission over a conventional CATV channel at the head end. The downstream data is typically selected from the spectrum spanning from 50 MHz to 800 MHz. To avoid using an existing video channel, the channel used by the network management system may correspond to a channel number somewhere above the last usable video channel on the cable network, where the carrier to noise level is small enough to allow digital data transmission with error correction.

A hybrid fiber/coaxial cable network 46 carries the baseband video signals to the remote users via cabling infrastructure 46. At the remote site 48 a demodulator 50 demodulates the downstream video signal and supplies the same to a microprocessor 49 which reconstructs Ethernet packets. These packets are fed into a client PC device 24 (FIG. 1) using a standard Ethernet adapter. Based on the capabilities of the broadband network, outbound information from the user's PC travels back to the pop LAN switch by way of the cable system or public switch telephone network. In the upstream direction, a VSB modulator 50 modulates data from the client processor 24. Microprocessor 49 effects control of VSB-modulated upstream data to send it back up the cabling infrastructure on an assigned channel, or to a telephone modem via, for example, an RS-232 port.

Figure 3:
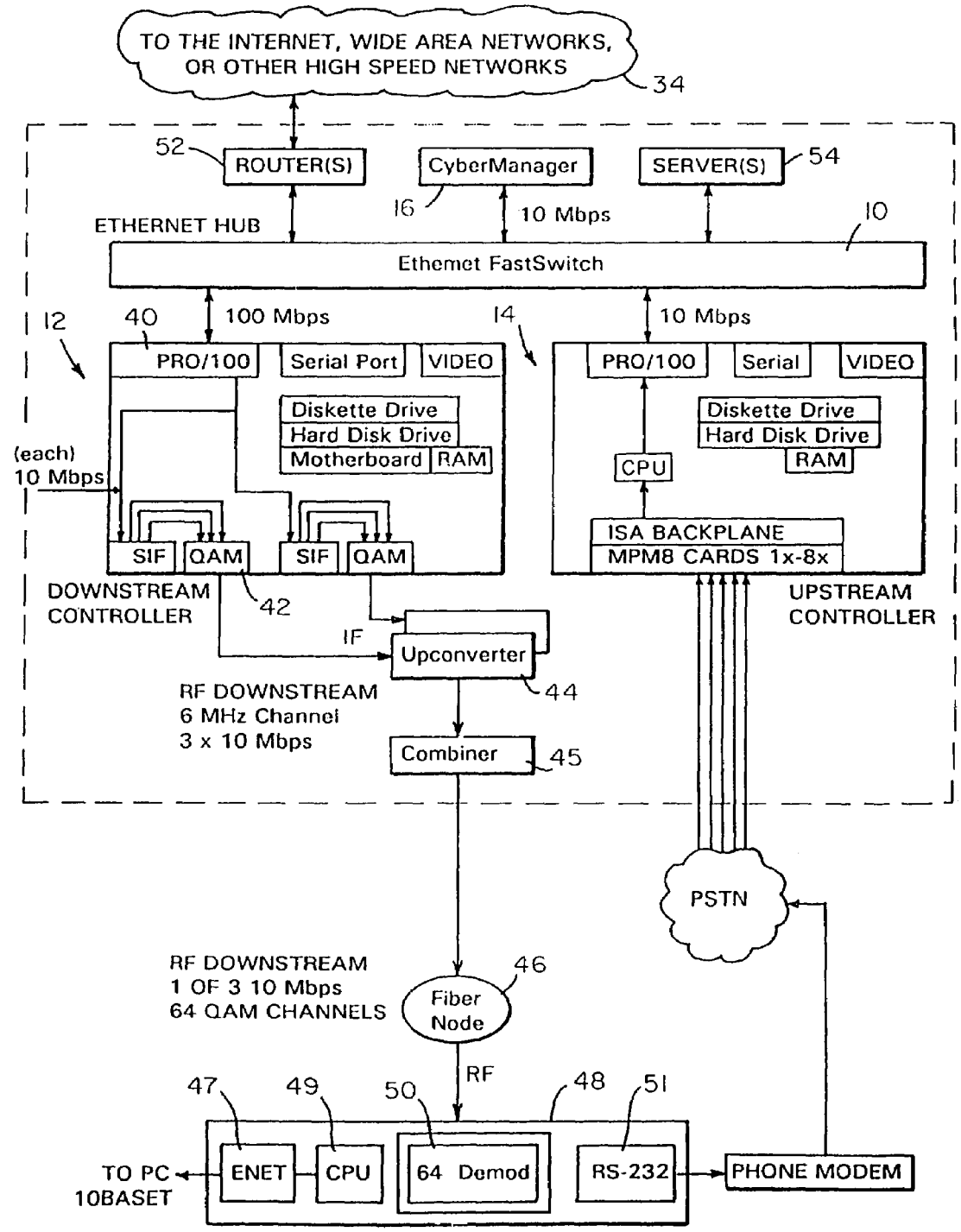
FIG. 3 is a functional block diagram of operational components of upstream and downstream controllers for a telephony-return asymmetric network system.

The remote device or cable modem 48, as indicated earlier, provides a standard 10BaseT Ethernet interface for a PC. This provides high-speed data services to the broadband network. In the preferred embodiment, each client cable modem 48 supports up to 20 PCs or workstations operating on an Ethernet LAN. Because many cable systems currently operating are limited, the cable modem 48 supports a return path by way of cable, public switched telephone network or by router return. To receive high-speed data via the ethernet LAN, cable modem 48 is tuned to a particular downstream channel frequency or time slot which is specified through software provided either in the modem 48 or the workstation 24 (FIG. 1). In addition, the client cable modem devices 48 are accessible to the POP router 52 and local content servers 54 by way of the downstream controller 12. For bi-directional broadband networks, the client remote device 48 includes a processor that processes the data and sends it through a separate upstream channel. The upstream controller 14 dynamically specifies the upstream frequency or time slot to enable the PC device to transmit data at speeds of 128 Kbps to 2.048 Mbps. For unidirectional cable systems, cable modem 48 provides upstream data via modem to a modem bank associated with the upstream controller 12 (see FIG. 3).

Figure 2:
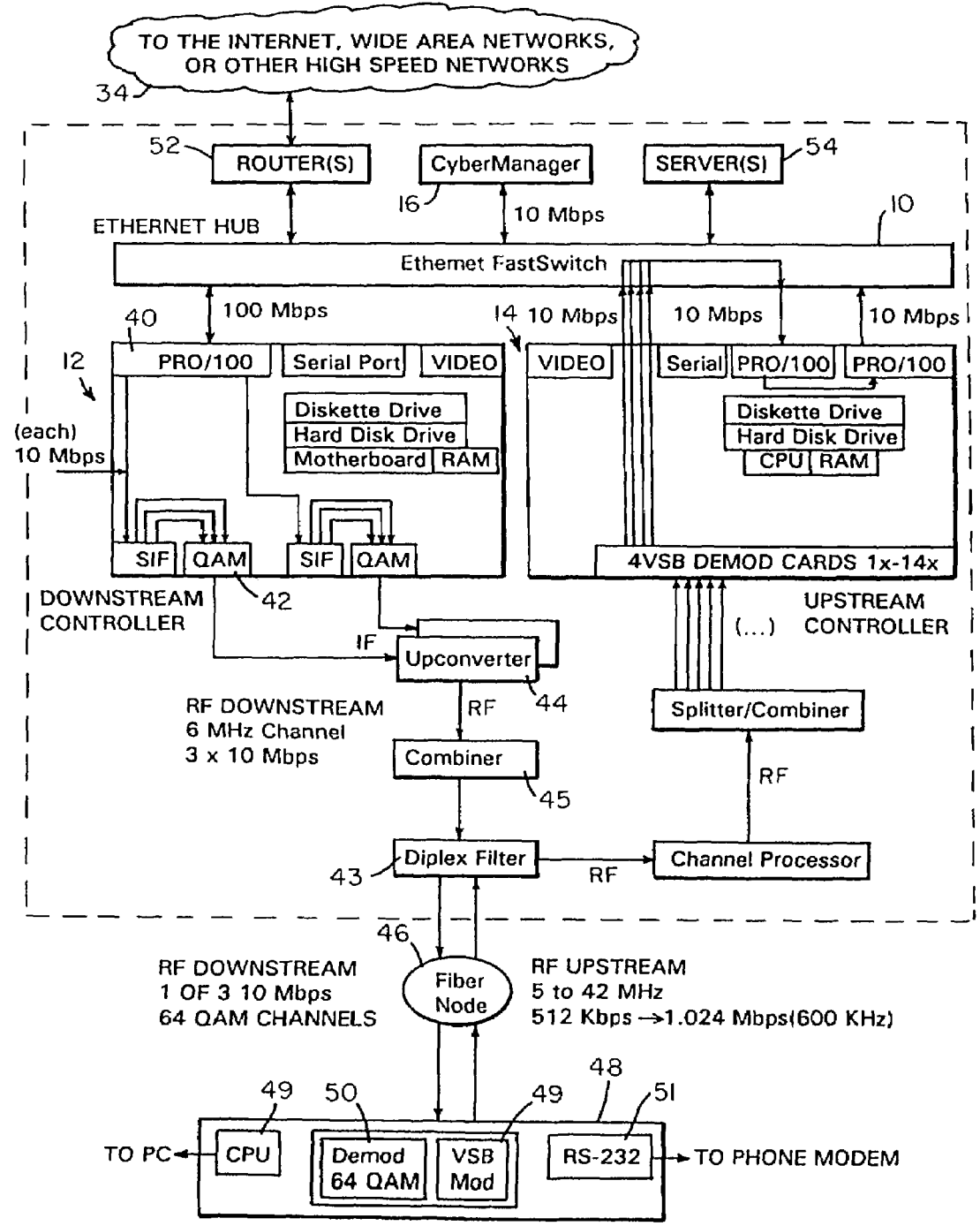
FIG. 2 is a functional block diagram of operational components of the upstream and downstream controllers in a cable-return asymmetric network system.

Upstream controller 14 manages the selection of upstream channels and performs medium access control (MAC) functions. In a cable return system, QPSK or VSB modulation is used on the upstream channel. As shown in FIG. 2, upstream controller 14 couples the Ethernet LAN switch 10 through a standard Ethernet 10BaseT or 100BaseT port for respective channels in the upstream path from the client cable modem 48. The upstream controller 14 tunes each channel, modulates data, extracts Ethernet packets and routes the data to external sources based on IP addressed. To achieve modularity, the upstream controllers 14 are configured to handle a maximum of twenty-eight channels each. Each channel is software configurable to operate at data rates from 128 Kbps to 2.04 a Mbps which is controlled by software selectable parameters.

The POP LAN switch 10 is an Ethernet/fast Ethernet switch that provides a single high bandwidth Ethernet fabric which connects all routers, servers, downstream controllers, upstream controllers and network managers. The POP LAN switch 10 operates at the link layer, but may be configured to operate at the network layer as well. The POP routers 52 provide a wide area network (WAN) for interfacing the Internet clout 34 and/or other service networks through standard interfaces, such as T1/T1, SW 56, ATM SONET, T3, ISDN PRI, etc. A variety of POP routers may be used within the network management system depending on the bandwidth of the required connections and the network protocols to be supported.

Figure 4A:
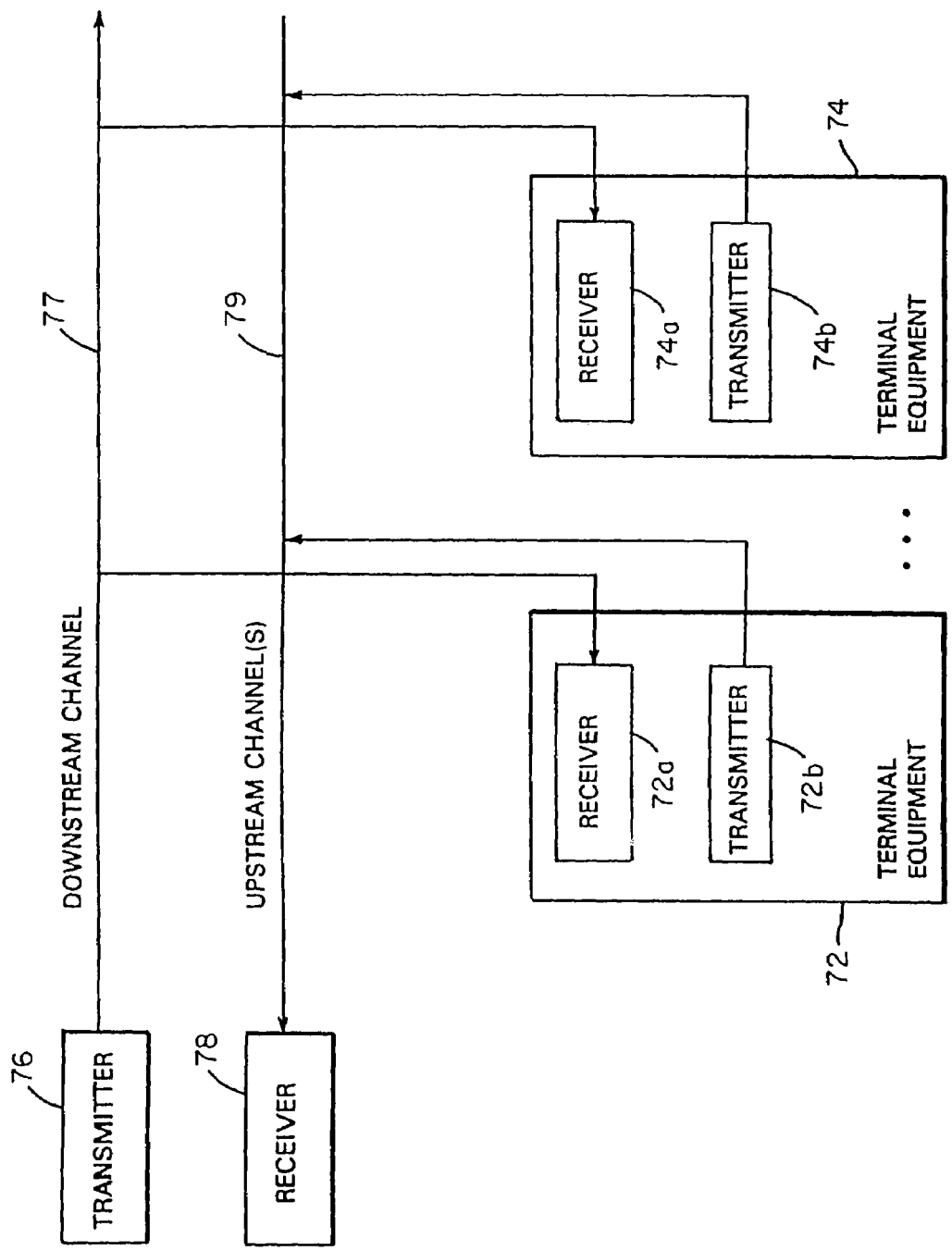
FIG. 4A illustrates the transmitter and receiver components of multiple remote devices in communication with respective transmitters and receivers of a two-way cable system.

FIG. 4A illustrates the remote interface devices 72 through 74 which receive high-speed data from transmitter 76 and transmit lower speed data to receiver 78. The transmitter 76 and receiver 78 are located at the network operator's head end plant. High-speed communication from a cable or wireless signal distribution plant are conveyed from transmitter 76 along a downstream channel 77 which comprises a hybrid fiber coaxial cable. Subscriber terminal equipment includes respective receivers 72a and 72b in communication with the downstream channel 77 for receiving high-speed transmissions. Channels 77 and 79 may comprise a wireless or satellite transmission medium. The subscriber devices also include transmitters 72b and 74b that are respectively coupled to the upstream channel 79 for transmitting lower speed return data to the network operator's head end equipment. In the head end equipment, media access algorithms control the subscriber's transmissions on the upstream channel 79. Media access control achieved through a downstream grant message is known as a "credit" packet and upstream relinquished/request messages are known as "done" packets.

There are two forms of credit packet control messages, CMD_CREDITS and CMD_POLL. Responses to the CMD credits and the CMD poll messages include RSP_DONE and RSP_POLL messages. The remote devices do not distinguish between these two forms of messages, but the network management system does. CREDIT packets and DONE packets refer to either type. The cable operator's network equipment assigns an IP address and the downstream MAC address based on the IP address of the subscriber's remote equipment. The aspect of the invention described here sets forth how subscribers acquire addresses and how the hybrid access system changes the addresses for existing subscribers. The subscriber's downstream MAC address is programmable by software in the subscriber's equipment in response to a command from the network operators equipment.

Figure 4B:
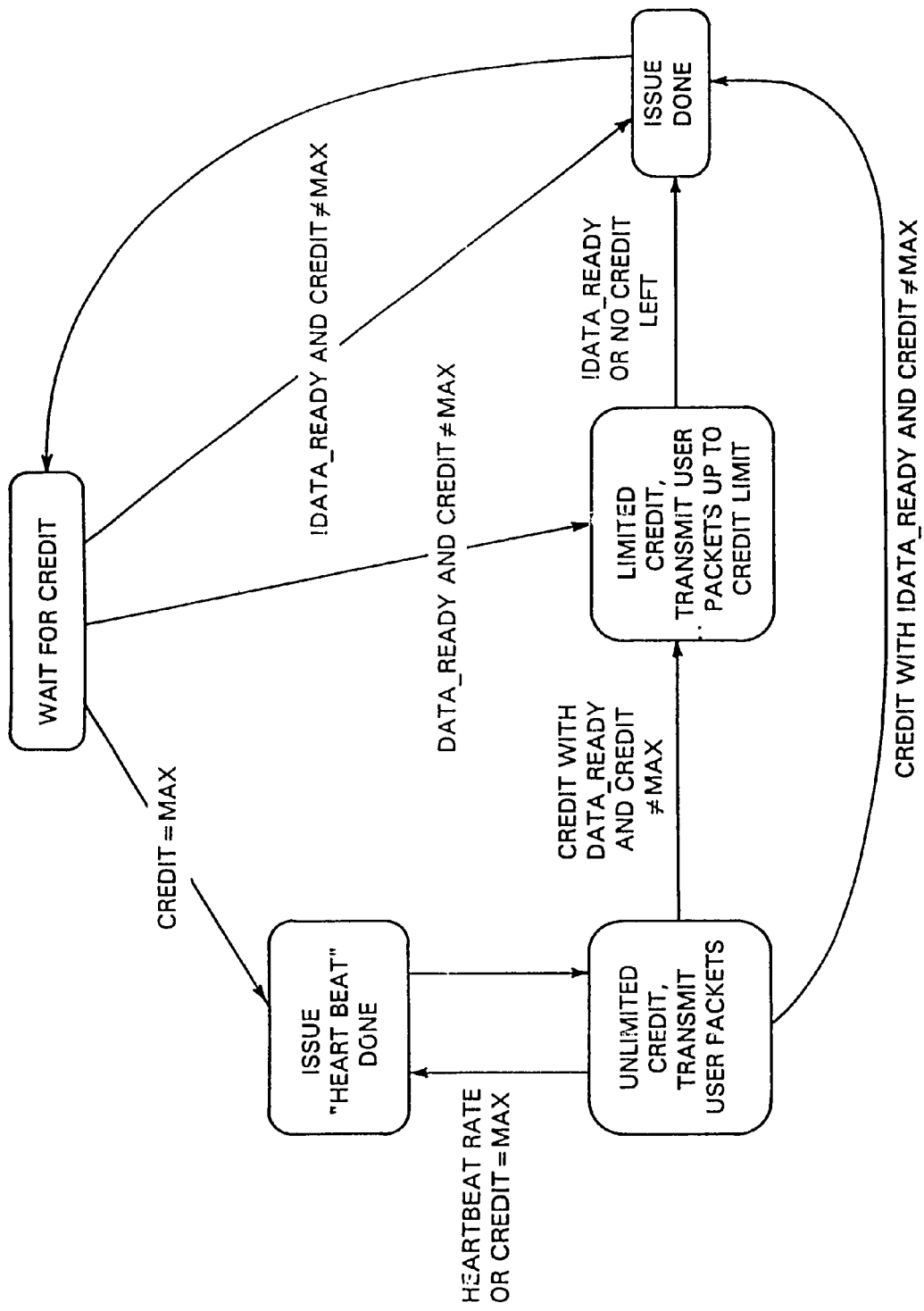
FIG. 4B is a depiction of the state machine illustrating generation of upstream data and DONE packets transmitted by the remote devices.
Figure 4C:
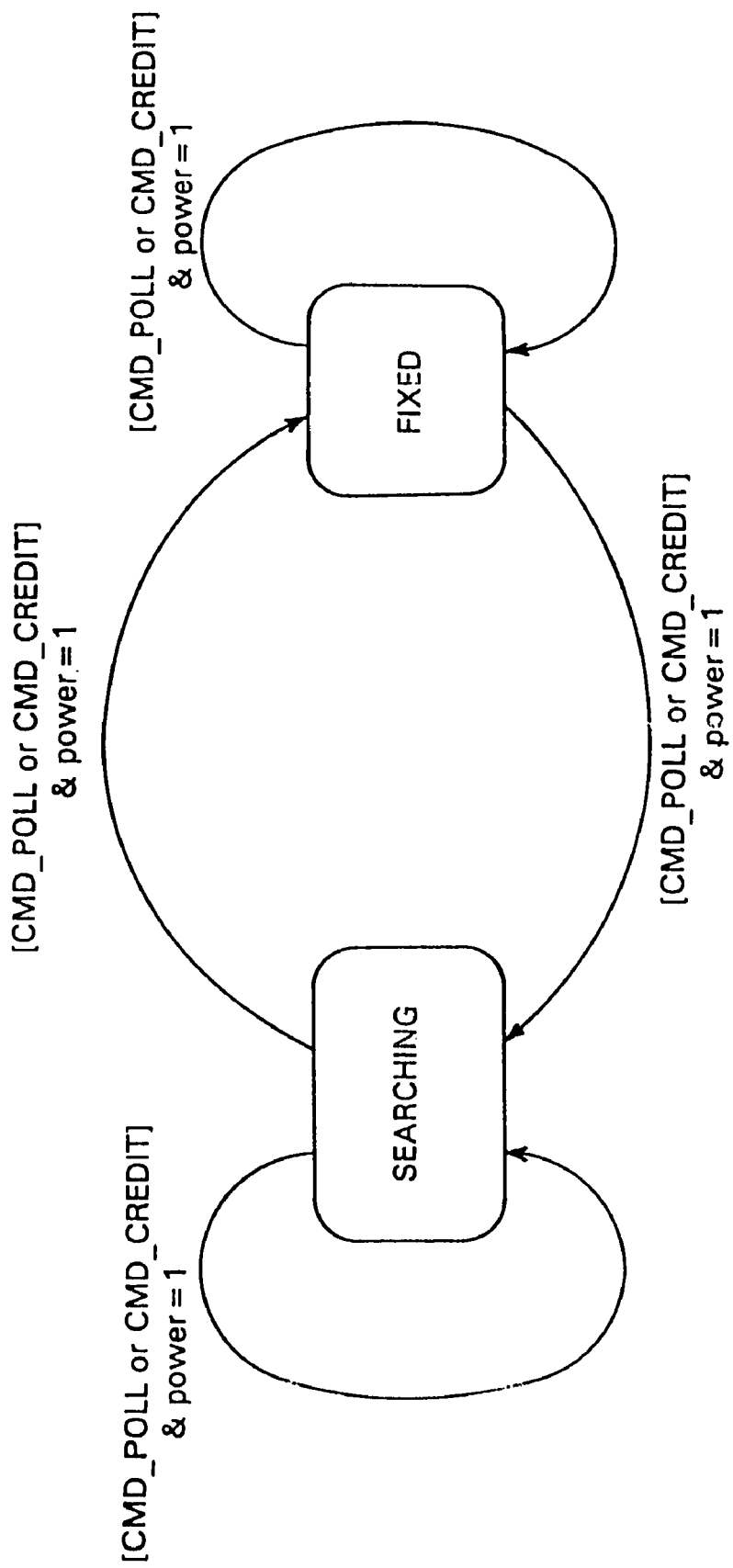
FIG. 4C depicts a state diagram of remote devices in a transmit power level setting scheme.

FIG. 4B depicts a state machine describing the upstream data transmission and DONE packet generation in the remote devices 72, 74. When the remote devices receive a credit packet with a limited amount of credit, they transmit data packets on specified upstream channels until they have either used up their credit value or have run out of packets to send. Remote device 72, for example, would then send a signal to relinquish its channel by sending a RSP_DONE or an RSP_POLL packet that was solicited by the network management system. The remote device 72 does not retain the channel while waiting for more packets to send. It only transmits those packets that are available to be sent without interruption. Also, the remote device does not introduce dead time in the upstream transmission, other than inter-packet gaps between the time it receives a limited credit packet and the time it relinquishes a channel with a done packet. In the special case where the limited credit issued by the network management system has a value of zero, the remote device does not respond by transmitting data packets, but instead, responds only with the solicited RSP_DONE packet.

When the remote device is provided with an unlimited credit ("credit"=max=0xffff), it transmits a solicited done packet on the specified upstream channel and then transmits data packets whenever they become available. If the credit packet does not have the SEND_DONE or SEND_RSP_POLL flag set, the remote device will not send a done packet. If the remote device sends an unsolicited done packet, network operator's equipment will process it in a normal fashion. Dead time on the upstream channel is allowed when unlimited credit is given. After an unlimited credit packet is received the remote device needs no further credit packets to use the assigned channel. If another unlimited credit packet arrives for the same channel, remote device sends out another solicited done packet in response and continues to use the assigned channel. If a limited credit packet is received, the remote device finishes any packet in progress, uses a limited credit assigned, issues a solicited done and stops transmitting on the channel. The remote device assigned with an unlimited credit sends periodic unsolicited RSP_DONE packets at a "heartbeatRate" that is specified in the credit packet. Depending on the options available in the remote device, credits can be based on the number of packets that can be sent or the amount of data that can be sent. In either case the credit amount does not include the done response packet itself.

The functions performed by the remote devices 72 and 74 include 1) initialization which involves pre-configuration of the remote device with start-up parameters to enable further configuration by the network operators equipment with an IP address; 2) re-configuration which includes assignment of a new IP address by the network operated equipment; 3) power ranging which establishes a proper transmit power level for upstream channel transmissions; 4) adjusting frequency (or time slot) which entails changing the upstream frequency (or time slot) by the network management system to optimized upstream reception; 5) transmitting data rate adjustment, which entails adjustment of the upstream data rate in response to control messages sent by the network management system; 6) commanding responses which include sending of responses by the remote devices in response control packets sent by the network management system in order to provide status information; 7) packet transmission which involves sending of data packets from the remote devices under control of the network management system; and 8) packet reception which includes filtering of packets by the remote devices on the upstream channel and passing selected packets which are addressed to the subscriber's PC. The remote interface device 48 includes a router functionality which may limit the incoming packets from the downstream broadcast to those destined for the subscriber's PC directly connected to it. At the subscriber's remote site, up to 20 PCs may be serviced by a single remote interface device 48. This number may vary according to design constraints.

The remote interface devices 72 and 74 have respective globally unique IP addresses "assignedIp" which all are configured by the network operator's equipment and downstream MAC addresses "downMacAddr" that are separate and apart from their upstream MAC address. The downstream MAC address is locally administered and is automatically configured based on the assigned IP address and/or account number. The account number "accountNum" is used by the network operator to initially configure the subscriber. It is an 11-digit decimal number that is given to the subscriber by the network operator at the time of initial subscription to high-speed data services. This account number may be a subset of a full account number used by the network provider. The subscriber's terminal equipment also includes an upstream MAC address "upsrcMacAddr," which is used for response messages RSP_DONE and RSP_POLL. An upstream destination MAC address, "dataDestMac," identifies the destination of the user data packets. A user identification number, "userID," is assigned to each terminal equipment unit by the manufacturer. Blocks of unique identification numbers are available from assignee hereof to terminal equipment manufacturers. When connected to the asymmetric network, the remote interface devices 72 and 74 automatically communicate their respective user ID's to the network management system.

The upstream MAC address ("upsrcMacAddr"), downstream MAC address ("downMacAddr") and destination addresses ("rspDestMac" and "dataDestMac") may be altered by the network management system or by the subscriber's equipment. The user ID or an upstream MAC address assigned by the equipment manufacturer is burned in a ROM located in the remote device or interface 72, 74.

The remote interface devices 72, 74 are controlled by three command packets sent by the network management equipment on the high-speed downstream channel 77. The first two packets are polling packets, CMD_CREDIT (Appendix A) and CMD_POLL (Appendix B), and are used to poll the remote devices 72,74 and assign credits for sending data packets upstream. The third packet, CMD_CONF (Appendix C), configures the remote devices 72, 74 with an IP address and an upstream destination MAC address for data packets, "dataDestMac". The CMD_CREDIT and CMD_POLL packets have a flag bit, SEND_DONE and SEND_RSP_POLL that are used to force a response from the remote interface devices. The remote interface devices 72, 74 have no response to the CMD_CONF message. The downstream command packets and information in the upstream response packets are used by the network management system to communicate with the remote interface devices and to control them.

Channel Assignment and Re-Assignment

An upstream channel within assigned frequency can be in use by zero, one, or several users. A channel can be declared to be "dedicated" and will never be assigned to more than one user at a time, or a channel can be declared to be "shared" and may be assigned to several users at a time. A shared channel is offered to each of the users in turn for their sending the defined amount of traffic according to an assigned credit value. The network management system may characterize a particular frequency (or time slot) at any point in time as unusable, being qualified for use, or available for use. The usability of an upstream frequency or time slot can be changed over time to interference or noise caused by energy sources. The upstream router or controller 14 negates this interference by adjusting the power level at which the remote devices transmit, and by performing background checks on a channel that is not in use.

The network management system detects failures or degradation of the downstream channel and/or loss of communication with a particular client device over an upstream channel. Degradation is typically indicated by an unacceptable cyclic redundancy check (CRC) error rate reported by a remote device on a particular node in the cable system. If a standby downstream interface has been provided, the downstream controller 12 and remote device 48 automatically switch to a standby channel. Data corruption in the downstream channel is determined by monitoring the CRC errors in the downstream packets. In the case of a connection oriented session (TCP), packets with CRC errors are retransmitted by request of the transport layer protocol. For connectionless sessions (UDP), packets having CRC errors are discarded.

Failure or degradation of an upstream channel is determined by monitoring the bit error rate and signal levels received at the upstream controller 14. The upstream controller 14 then reports status information to the network manager 16. When a failure or unacceptable degradation is detected, the upstream controller 14 moves the remote device 48 to another available channel frequency on the node. The bad channel is continually monitored for usability and a channel quality database generated and stored in the upstream controller 14. A detected bad channel is periodically monitored and is reassigned when the upstream controller 14 determines that it passes a criteria for reception and signal level. The upstream channel monitoring and reassignment functions are preferably performed by the network manager 16, but again, any of these functions may be performed by other network components.

Bandwidth Management

Downstream bandwidth may be partitioned into classes of services such that users or applications can be assured of a certain level of throughput. The network management system performs a function to balance channel usage among multiple channels in the downstream path that will allow for reserving bandwidth for selected clients sessions.

Downstream controller 12 performs bandwidth management. The total amount of bandwidth allocated to guarantee traffic is determined from a configuration file stored in the network management system and can be modified by the network operator. If the traffic on the network exceeds a limit set by the operator, the downstream controller 12 strives to reach the limit over time without disrupting ongoing user sessions. Guaranteed bandwidth reservation is provided through an application interface from the network operator's side, or the subscriber's side, and factors including the amount of bandwidth requested and inactivity time is utilized in reserving a given amount of bandwidth. Inactivity time-out values are utilized by the downstream router to drop sessions or users which appear to have dropped out. In the preferred structure, downstream controller 12 reserves bandwidth in increments of 1 Kb per second. Examples of applications using guaranteed bandwidth include video conferencing, video streaming, CD services and broadcast/multicast advertising services. The services may require a fixed or constant bit rate, or variable bit rate service.

The bandwidth management function also allows an external application running in the network management system to move clients from one downstream channel to another. In order to implement the load balancing function, the network management system obtains channel utilization, the amount of bandwidth that is not dedicated for guaranteed bandwidth functions, the utilization of other sessions, the number of sessions having guaranteed bandwidth and/or the amount of bandwidth dedicated to particular source/destination IP address pairs. The channels or sub-channels from which the remote device 48 is moved are controlled by the network management system. To perform the task, downstream controller 12 or other devices in the network management system maintains internal routing tables that track the operative characteristics of the downstream channels, utilization and/or assignment thereof to the respective remote devices. The previous location and default frequencies of the listening channels of remote devices are also maintained, otherwise the management system may lose the ability to find a remote device. The default frequency is a frequency on which a remote device will operate after power off, or after a lengthy time-out from a poll initiated by the upstream controller. The management system is equipped with the control panel or interface to commit the network operator to override any automatic load balancing function. Multiple load balancing domains may also be provided, each having its own load balancing algorithm or rules.

A downstream channel monitor is also provided for collecting data. This allows the network operator, through user interface facilities, to inspect and observe consumed channel bandwidth by the remote devices. A software interface of the network management system allows viewing of bandwidth data as a function of time. This enables the operator to allocate the guaranteed bandwidth on any targeted channel or user. The channel monitor permits the operator to set aside the total amount of bandwidth dedicated to the guaranteed bandwidth service and/or to move a remote device or user from one load balancing domain to another.

Upstream routing provides for the delivery of data from a subscriber's remote device to the network operation center. Data, for example, may be delivered over 100 kHz sub-band channels at a rate of up to one two-way Kbps. Each subscriber connects to one physical fiber node of the cable operator's distribution system. One or more physical fiber nodes are defined for administration purposes to be a logical fiber node. Upstream channels are allocated among subscribers in logical fiber nodes. Each upstream channel is assigned to a particular frequency. This means that once a frequency is occupied by a remote device on one physical fiber node, this frequency becomes unavailable to remote devices from other physical fiber nodes if they belong to the same fiber node grouping.

A channel scheduler, e.g., a program module, is provided in the network management system for assigning users to unoccupied channels. This means that the remote device is assigned to a dedicated channel if the remote device is not entitled to such service. As the need for dedicated channels arise for other devices who have reserved services, the scheduler may move a remote device which is not entitled to the dedicated service to a channel that is shared. The scheduler will attempt to balance the load of shared channels based on channel usage derived from DONE messages. Channels will be managed by short-term schedulers that continue to support non-responding units, dedicated service, shared service, etc., though scheduler decides, based on class of service (dedicated, shared, . . . ) where to initially assign a new client device connecting to the network. The information on the default class of service for the client device resides in a table stored in at least one of the components of the network management system and is provided to the upstream controller 14. The scheduler may, at liberty, assign client devices to a class of service higher than the ones to which they are entitled if there are sufficient resources to do so. The network operator is also able to set the maximum number of users per shared channel.

Channels allocated to different types of service will be determined from information contained in a configuration file. This information may be modified by the network operator through an interface provided by the network management system. When the current serviced type assignment on the upstream controller 14 is modified by the operator, the network management system strives to conform to the new assignment over time without disrupting other user sections. Non-responding units are parked on channels which have been designated for such service. At most, one user is present on a channel that has been designated a dedicated channel. Shared serviced channels are used by, at most, "n" users where "n" is greater than one. "N" may be set by the network operator. A test channel is also provided by the network management system and will not be available to normal network devices.

A short-term scheduling function of the network management system monitors incoming ports of the upstream controller to assess channel quality. Channel quality is based on the noise floor level. The noise floor is continuously computed by digital signal processors that are responsible for the channel. It is based on a running average of fifteen consecutive samples, taken in consecutive fifteen symbol times, according to design choices. The information may also be averaged over a longer period of time, if necessary, to achieve some higher level of noise floor management function. The network management system may indicate trouble upon detection of excessive noise, or even a very low noise floor. The network manager removes bad channels from a pool of available channels automatically, or channels may be removed under operator control. Channels that are automatically disabled are returned to the pool of available channels by the network management system when the conditions that caused their disability disappears. Manually disabled channels require manual enabling.

The network manager system may also be provided with a roving short-term scheduler that continuously scans the spectrum which is not allocated to any remote device. The roving function moves from one frequency to another to measure noise floor level. Samples are collected and periodically the quality of unused channels are compared to the noise floor on channels which are currently assigned to other upstream ports. Such information is utilized by the network management system to allocate ports to a cleaner portion of the spectrum. In a preferred structure, the DSP which manages a particular channel reports off-center frequency deviations of, for example, 2.5 kHz, and reports the same to the scheduler for corrective action.

An upstream channel monitor collects data on the upstream channel. This function allows the network operator to observe the quality of upstream channels as detected at upstream controller 14 and the network management system to more effectively manage bandwidth and channel assignments. The user interface, provided by the network management system, enables the network operator to view upstream channel characteristics as a function of time and frequency. Information provided includes noise floor, carrier level, signal quality, carrier frequency, signal-to-noise ratio, channel occupancy and utilization, channel type (dedicated, shared . . . ), and transmit power levels. Signal quality is a count which reflects degradation due to distortion, reflection, echoes, etc. The higher counts indicate lower quality channel. This count reflects the speed with which the equalizer software converges in the DSP. In addition, the channel monitor allows the operator to designate the channel as a Viterbi snoop channel which allows the operator to enable a Viterbi error count display. Other information available subject to DSP support includes the noise, the power and ingress counts.

The channel monitor enables the operator at the network operation center to manually override power settings of any remote device. In addition, the network operator may manually disabled or enable channels, set alarms for unacceptable signal-to-noise ratio, Viterbi count errors to noise floor level, frequency deviation and signal quality. Moreover, the network operator may modify power operating ranges for a client device, the fiber node or group of fiber nodes, or the system generally. Further, the network management system enables the operator to modify the type of channel usage, i.e., non-responding, dedicated, shared, test, or roving service for DSP configuration. The network operator may also download new software into the DSP or reconfigure the DSP.

Forward Error Correction

Figure 4D:
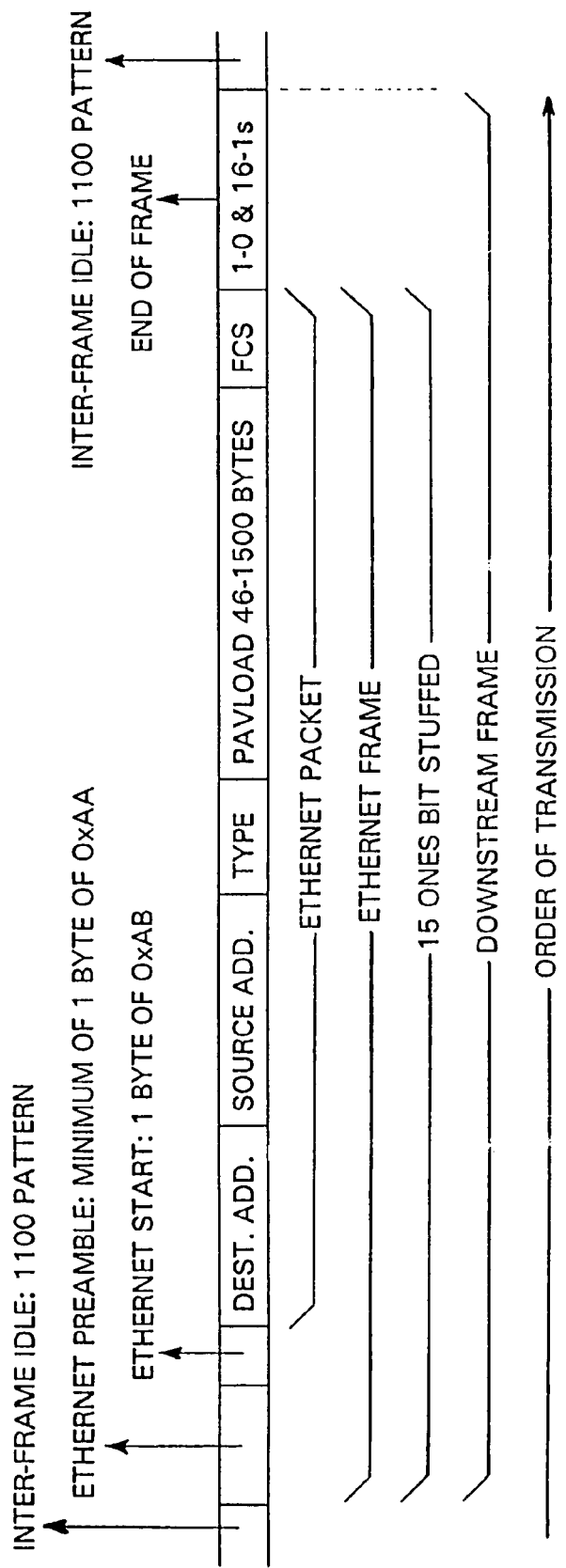
FIG. 4D shows a packet structure of a downstream data link frame encoding scheme.
Figure 4E:
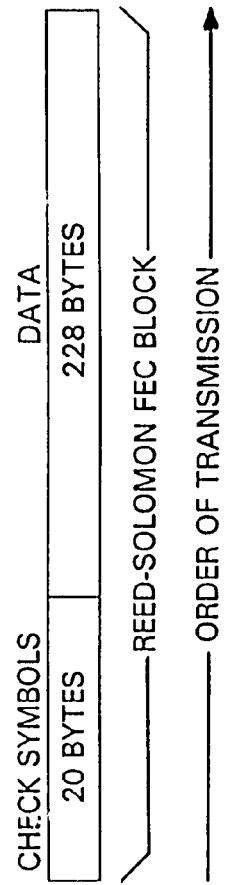
FIG. 4E depicts a Reed-Solomon encoded packet structure.
Figure 4F:
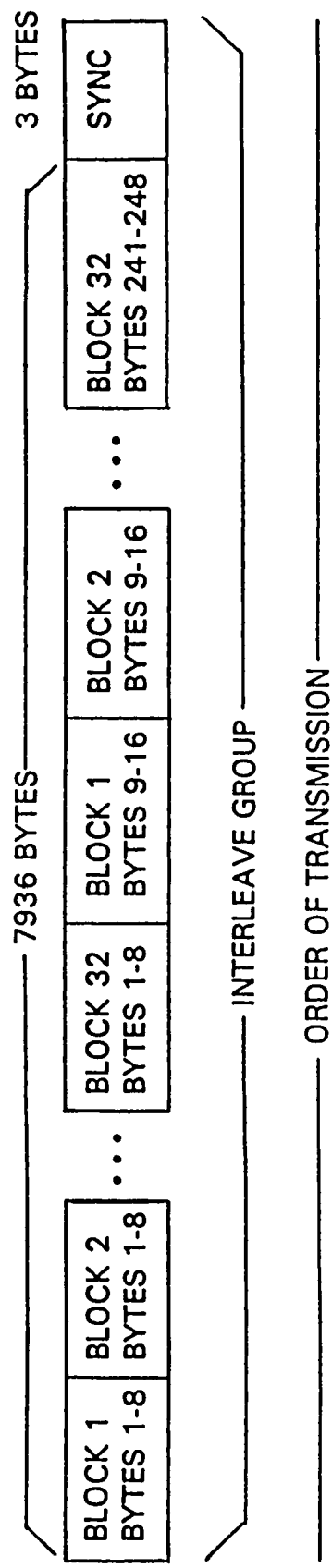
FIG. 4F illustrates interleaving applied in a forward error correction scheme on the downstream channel.

The downstream controller 12 packetizes, frames, bit-stuffs, Reed-Solomon encodes, and interleaves the downstream data as specified in FIGS. 4D and 4E. The remote devices 72, 74 reverse the steps to decode and extract the original data. Downstream data is sent over the cable in a downstream frame that encapsulates an Ethernet packet (FIG. 4D). Encapsulation is performed by the downstream controller 12 which constructs an Ethernet packet and prepends an Ethernet preamble of one or more preamble bytes and one start byte thereby to construct the Ethernet frame. Thereafter, the Ethernet frame is bit-stuffed by replacing consecutive trains of fifteen ones with fifteen ones followed by one zero. The controller 12 marks the end of the Ethernet frame (EOF) with a flag comprising a unique pattern, e.g., one zero bit and sixteen one bits. The downstream frame is then transmitted on the downstream channel one at a time with the least significant bit (LSB) being transmitted first. The network equipment sends data continuously on the downstream channel. If no packets are available to be sent the network equipment sends an idle pattern. The downstream data link interface idle pattern byte is a repeating pattern (e.g. . . . 11001100 . . . ).

The serial bit stream containing downstream frames and inter-frame idle patterns is scrambled using conventional algorithms. The output of the scrambled bit stream is encoded with a Reed-Solomon forward error correction (FEC) algorithm. For every block of 228 bytes of data, 20 bytes of forward error correction checksum symbols are added, as indicated in FIG. 4E. FIG. 4E depicts the constructed frame, the generator polynomial, and a primitive polynomial for Reed Solomon encoding. The downstream controller 12 of the network management system forwards the bytes of the Reed-Solomon forward error correction block least significant first starting with the data byte, continuing through to byte 228, and then starting with the least significant byte of the 20-byte checksum.

After the forward error correction algorithm is applied to the data, bytes from the forward error correction blocks are interleaved. Interleaving takes eight bytes of data from each of 32 forward error correction blocks to form a new serial stream, as indicated in FIG. 4 F, which shows taking bytes 128 from block 1 followed by bytes one through eight from block 32, and so on, up to 128 bytes from block 32. After this, bytes 9–16 are taken, blocks one through 32. This continues until all 248 bytes from all 32 blocks are sent and is again start over with the next 32 forward error correction blocks of data. An interleaved group is made up of 7936 bytes of data (32 channels×248 bytes/channel). For every interleaved group, a three byte-interleaved synk flag is added. The flag is: 0x33, 0xa5, 0xe1. This flag is transmitted with 0x33, least significant bit first.

Upstream Frame Format

Figure 4G:
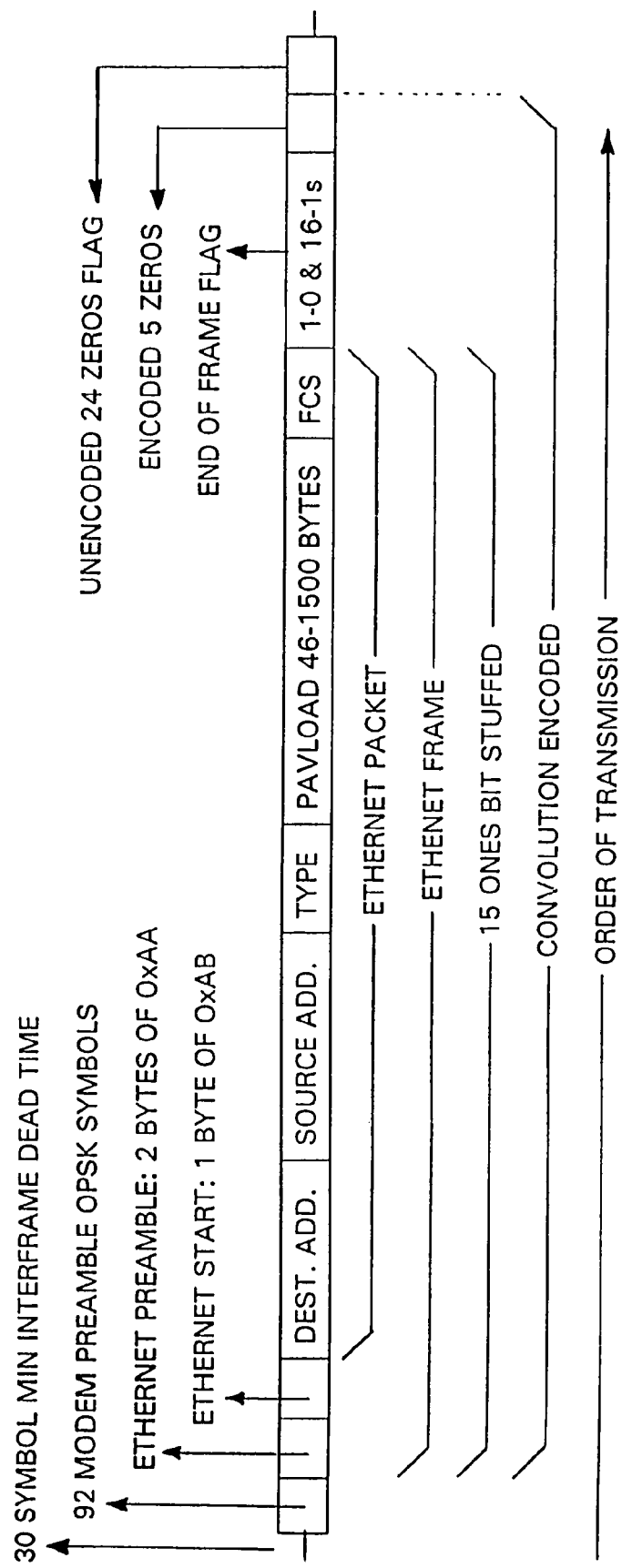
FIG. 4G. illustrates the packet structure of upstream frame transmitted by remote devices.
Figures 4H, 4I:
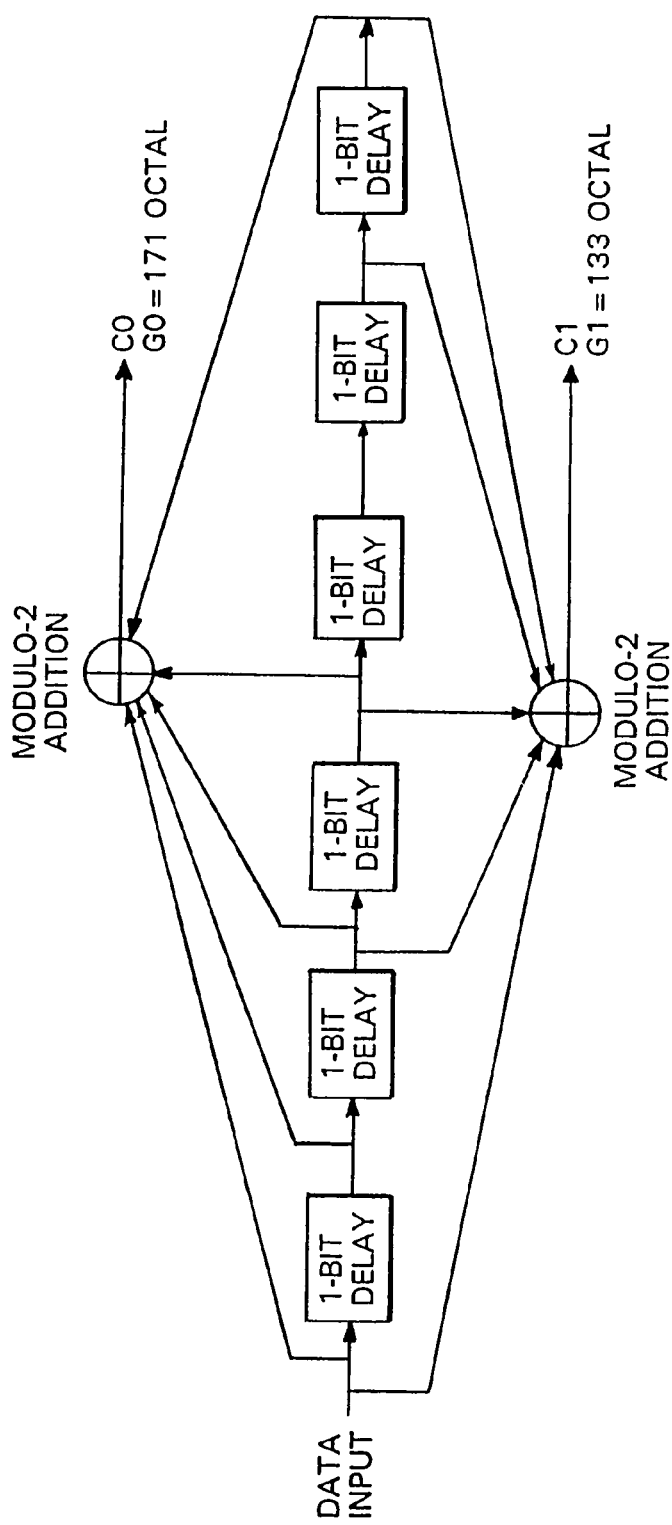
FIGS. 4H and 4I depict constraints of Viterbi encoding used in upstream transmission from remote devices.

FIG. 4G. depicts the upstream frame format for packets transmitted from the remote devices 72, 74 to the network operations center, e.g., the upstream controller 14. In operation, remote devices send Ethernet data packets upstream in an encapsulated frame. Frames are sent in burst mode with no signal period (inter-frame time) between them. To begin a transmission, the remote device initiates a frame transmission with a preamble pattern of a specified number of symbols, but does not encode or scramble the symbols. The Ethernet packet follows the preamble, the least significant bit being transmitted first. The remote device then transmits Ethernet compliant packets, byte by byte. An end of frame (EOF) sequence is also inserted. Thereafter, the packet is Viterbi-encoded using a constraint length of seven symbols, as shown in FIGS. 4H and 4I.

Configuration Management

The network controller 16 is an SNMP (simple network management protocol) based network management system that is used as a network system administration interface for the downstream and upstream controllers (routing or switching devices), as well as for other POP devices. Controller 16 provides a GUI-based editor to perform network configuration management and facilitate full definition and automatic distribution of all network configuration files associated with the respective remote devices. It provides the POP system administrator with an easy-to-use facility to configure the system; to provision for new subscribers and manage accounts; to monitor POP equipment; to manage and diagnosed client cable modem devices; and to initiate corrective actions. It also allows the direct and automatic configuration of databases and networks for use with other routers and hosts. Network controller 16 also acts as a bandwidth manager, traffic statistics collector and IP address database, as well as performing many other tasks identified by the parameters of Appendices A through E. Some of these configuration tasks are further explained below, but all are self-evident from the control and information packets described in the appendices.

IP Address Management

The network management system described herein also provides efficient use of rapidly dwindling IP addressing resources. Routing traffic to downstream channels allows network administrators to assign sub-address partitions from an IP address space allocated by InterNIC. The network manager 16 effects assignment of address partitions to each channel which fits the number of subscribers or remote device 48 located at sites remote from the network operations center of the cable head end. As the number of subscribers increases, network manage 16 expands the downstream channel addressing by adding additional self-addressed partitions. Downstream routing is sufficiently flexible so that network can adapt to any extended IP addressing standard that may be affected by InterNIC. Control of IP address management may be effected either by the network controller 16 or the downstream controller 14.

Status Reporting

A microprocessor in the remote interface device 48 runs a simple management network protocol which allows the network management system to communicate directly with it for purposes of checking connectivity status, and diagnosing and troubleshooting network operations. The network operating software required for operations of the remote interface device 48 resides in the downstream controller 14 and/or the network manager 16 which, when a new remote device is connected or updated, is automatically downloaded from the network controller 16 or downstream controller 14, depending on the configuration. The remote device 48 also includes simple management protocol software which is used to set up, communicate, and diagnose the remote device 48. The simple management protocol software is automatically distributed to remote device 48 by the network management system. Also, the network management system is provisioned to gather traffic statistics from the remote devices in order to implement load balancing and other traffic management functions.

Upstream Data Rate Adjustment

The remote device may transmit data at rates that are selectable in increments of 128 Kbps. Preferably, the maximum transmit rate of the remote device is determined at subscription time. The network operator's equipment sends credit control packets with transmit rates, "data rate", encoded in them according to the following table;

TABLE I

| "dataRate" Encoding | Transmit Rate (kbs) | Special Command or Notes |
|---|---|---|
| 0x00 | 0 | Trans. Off, cease sending data or response packets |
| 0x01 | 128 | Basic default rate |
| 0x02 | 256 | |
| 0x03 | 384 | |
| 0x04 | 512 | |
| . | . | |
| . | . | |
| . | . | |

TABLE I-continued

| "dataRate" Encoding | Transmit Rate (kbs) | Special Command or Notes |
|---|---|---|
| 0x0c | 1,536 | |
| 0xff | 32,640 | |

In response, the remote devices utilize the parameter "dataRate" for configuring itself to transmit at the commanded data rate.

Power Level Adjustment

The network management system may also altered to transmit power level of the remote device 72, 74. In operation, the remote device searches for an appropriate level of power at which the network equipment receives or detects upstream data packets, or alternatively, the transmiter level may be explicitly set by the network operator's equipment. The usual procedure entails the remote device searching for an appropriate level until "heard" by the network equipment, and then the network equipment sets the power level. When the remote device 72 receives a credit packet having a level value of zero for the power level setting, it sets to transmit power at maximum attenuation. As a consequence, done packets sent upstream will not be received by the network equipment. The following table depicts a typical transmit power gain implemented in the upstream channel:

TABLE II

| "power" | Gain |
|---|---|
| 0x0 | min. transmit level −1.25 dB/mv |
| 0x1 | +2.75 dB/mv |
| 0x2 | +6.75 dB/mv |
| 0x3 | +10.75 dB/mv |
| 0x4 | +14.75 db/mv |
| . | . |
| . | . |
| . | . |
| 0xf | +58.75 db/mv |

A remote device transmission level state machine is depicted in FIG. 4 C. As illustrated, when a credit packet is received with a level value of "power"=0x1, the remote device enters a "searching" state and starts transmitting with the level set to +2.75 dB/mv. As seen, the remote device searches for the level that can be "heard" by the network management system, and stops the search and goes into the "fixed" state when it sees a credit packet with an explicit level power≠1 Any time the remote device receives a credit packet with the level step 21, it goes back into the "searching" state and re-starts the power level search again while in the searching state. The remote device transmits at least two responses at a level before incrementing to the next. The network equipment adjusts the power level of the remote device any time by changing the level in a credit control packet. For dedicated channels, the credit packet is set with unlimited credit to change remote device transmit power and not otherwise affect the channel assignment. The remote device waits for a unique packet that is in the process of being transmitted to finish before the power level is changed.

Upstream Frequency Adjustment

The network management equipment automatically adjusts the remote device's transmit carrier frequency in increments of 1 kHz by way of a "ctlFreq" parameter transmitted in a credit control packet. The upstream transmit frequency may be altered at any time. For dedicated channels, a credit packet is set with an unlimited credit to change the remote device's frequency and otherwise not change the channel assignment. The remote device waits for any packet that is in the process of being transmitted before changing its frequency. The following table depicts hexadecimal values for the parameter "ctlFreq" and associated upstream transmit frequencies:

TABLE III

| 0x00000000 | 0.000 Mhz |
|---|---|
| . | . |
| . | . |
| . | . |
| 0x00001388 | 5.000 Mhz |
| 0x00001339 | 5.001 Mhz |
| 0x0000138a | 5.002 Mhz |
| 0x000fffff | 1,048.575 Mhz |

On initial power-up, the remote device sets its upstream transmit frequency to 4 MHz until it has received a credit or polled packet from the network management system instructing a different frequency. Similarly, in the situation where upstream channels are defined by time slots, channel adjustment is made by changing the slot(s) at which a remote device is assigned.

Configuration of Remote Device

FIG. 5 illustrates a sequence of operations used for connecting a new subscriber to the network. In step 1, a subscriber acquires a cable and installs a hardware modem (e.g., remote device 48). Prior to installing the software the network operator provides an account number to the subscriber. The cable modem user interface device, during installation, prompts the subscriber for the account number. Thereafter, the software automatically configures the downstream MAC address for the remote interface device 48. In the preferred operation, the network operator also provides the subscriber with the downstream channel to which the remote device shall be tuned or slotted. Configuration features in the remote device include a) variable data transmission rates which are available and parameters of the remote device to indicate the various upstream data rates the subscriber's equipment desires and is able to operate (the default data rate is 128 Kbps); b) a credit scale which indicates the units of packets, e.g. data length, the remote interface is able to transmit (remote interface device supports packet based credits as a default or packet length-based credits as an option); and c) a transmitter carrier range wherein the network management equipment issues credit to transmit at a particular frequency (or time slot) of an upstream channel. These optional features are detected by the network equipment through flag option queries, credit packets and done responses.

In step two of FIG. 5, the subscriber has completed installation process and has powered on the remote device 72, 74. At this point, the network operator's equipment begins polling with CMD_CREDIT or CMD_POLL packets that are addressed to temporary addresses programed into the downstream MAC address, "downMacAddr." At this stage, the network equipment uses an arbitrary number for the assigned IP address. Although CMD_POLL packets are transmitted to the remote devices 72 and 74, they do not distinguish between the command types. The network management system will send instructions during the initial poll with the power level setting set at the lowest level 0x01 and no credit granted. The network management equipment requests the remote device's upstream MAC address, transmit power level, and configuration number "seriesID". As indicated earlier, the power level setting 0x01 is selected when the network equipment commands the remote device to search for the current power level. The remote device responds to the CMD_POLL packet with RSP_POLL packet as indicated in step 3 of FIG. 5. Because the transmit power level may not be correct in the first instance, the response by the remote device may not be received by the network operator's equipment. For this reason, the network management equipment may issue a repeated CMD_POLL packet as indicated in step 2.

In step four of FIG. 5 the network management system receives the response from the remote device and generates a configuration message CMD_CONF. This is addressed to the remote device's temporary MAC address based on the account number assigned to the remote device. The remote device decodes the CMD_CONF packet and configures the subscriber IP address and the downstream MAC address, and thereafter, switches to receive packets at the new IP address and MAC address. The network operator's equipment follows the CMD_CONF message with a CMD_POLLI or CMD_CREDIT packet which is addressed to the remote device's new IP and MAC addresses, as indicated in step 5. In step 6, a response from the remote device confirms the re-configuration.

When the network management system receives the response poll packet as indicated in FIG. 5, it inspects the seriesID. For new remote devices or remote devices that have lost their configuration, the seriesID is set to zero to inform the network management system of a need for re-configuration. For an established remote device the seriesID is set to the last value received in the CMD_CONF message, and then the network operator's equipment determines if re-configuration is required. To reconfigure the remote device, network operator's equipment implements steps 4, 5 and 6 of FIG. 5.

Downstream Packet Filtering

The remote device filters packets on the downstream channel using the destination MAC address of the Ethernet frame. The downstream MAC address "downMacAddr" is assigned to the remote device by the network equipment. The IP address of the remote equipment is assigned as part of an installation scheme and can be changed as requested by the cable operator. The remote device receives packets that are addressed either to its assigned IP address, IP multicast address or IP broadcast address. The IP address assigned to the remote device is used as the destination address on the downstream channel and as the source address of the upstream channel. The remote device discards packets received with destination MAC addresses not assigned to it. The remote device is provisioned to prevent risk of listening which cannot be defeated by re-programming or switch settings. An initial default assigned IP address can also be assigned to the remote device. The remote device also receives packets with an Ethernet broadcast address or assigned multicast addresses.

Account Management

The network management system is also provided with billing management functions including the ability to keep track of byte counts and packet counts. Usage information is tracked and collected based on IP source and destination addresses. Generally, information collected by the billing management function of the network management system includes a billing record ID, billing data collecting device ID, date, time, client ID, client IP address and activity records. Monitored account activity includes upstream/downstream packet counts, upstream/downstream byte counts, and other activity on the network, including quality of service compliance statistics.

In addition, the network management system is provided with account management functions which permit the network operator to add or delete a client from the database, to modify or reconfigure client information, or to initiate an installation/re-configuration process. Furthermore, the account management function displays the state of remote devices, e.g. whether it is not configured, in test, non-responsive, active, residing on a dedicated or shared channel or idled. The account manager also displays usage statistics and currently available billing records. The operator may also suspend service to a remote device, as well as distribute new or upgraded network operating software to remote devices.

Based on the teachings hereof, variations of the disclosed embodiments are apparent to those skilled in the art. Although a two-way cable and telephony return cable systems are illustrated, the invention also embraces wireless, optical, fiber, satellite broadcast and cellular systems. Return paths may include telephone, router and RF transmission links, such as point-to-point radio frequency links. Other adaptations and substitutions of other components and steps are also evident from the teachings hereof. Thus, we do not intend to limit our invention to what is depicted or described, but instead, include all such adaptations, modifications and substitutions now known or which may become known to those skilled in the art.

We claim:

1. A two-way asymmetric communication system having independently scalable upstream and downstream paths that enable remote data processor devices to communicate with a server, said system comprising:

a common routing/switching backplane for providing intercommunication services among multiple communication devices including said server, an independent upstream controller in communication with said backplane operating in accordance with an upstream protocol for receiving information packets from said remote data processor devices, said upstream controller including network operating algorithms for analyzing response packets transmitted by said downstream controller to determine operational status of a first identified remote data processor device, an independent downstream controller in communication with said backplane for transmitting data packets to said remote data processor devices in accordance with a downstream protocol, said independent downstream controller being operative to transmit control packets directed to said first identified remote data processor device that instructs said device to respond with predetermined information in accordance with said control packet, a network manager in communication with said independent upstream and downstream controllers through said backplane for effecting management of two-way communications between said first remote data processor device and a second remote data processor device, and said server; and including multiple sub-channels in a downstream path and a bandwidth manager for dynamically balancing traffic loads in the downstream path in order to provide greater use of available downstream channels according to traffic conditions.

2. The two-way communication system as recited in claim 1 wherein said independent upstream and downstream controllers comprise separate and independent hardware components including interface cards mounted in a rack.

3. The two-way communication system as recited in claim 1 wherein said common switching/routing backplane comprises an Ethernet LAN hub.

4. The two-way communication system as recited in claim 1 wherein said downstream controller effects transmission of control packets that detect assignment of upstream transmit frequency utilized by a remote processor device, and said remote processor device assembles and transmits response packets which contain information indicative of the upstream transmit frequency being used by said remote processor device.

5. A two-way asymmetric communication system having independently scalable upstream and downstream paths that enable remote data processor devices to communicate with a server, said system comprising:
   a common routing/switching backplane for providing intercommunication services among multiple communication devices including said server,
   an independent upstream controller in communication with said backplane operating in accordance with an upstream protocol for receiving information packets from said remote data processor devices, said upstream controller including network operating algorithms for analyzing response packets transmitted by said downstream controller to determine operational status of a first identified remote data processor device,
   an independent downstream controller in communication with said backplane for transmitting data packets to said remote data processor devices in accordance with a downstream protocol, said independent downstream controller being operative to transmit control packets directed to a first identified remote data processor device that instructs said device to respond with predetermined information in accordance with said control packet,
   a network manager in communication with said independent upstream and downstream controllers through said backplane for effecting management of two-way communications between said first remote data processor device and a second remote data processor device, and said server; and
   wherein said downstream controller applies forward error correction to control packets transmitted on said downstream paths.

6. The two-way system as recited in claim 5 wherein said forward error correction includes Reed Solomon encoding and interleaving of information packets.

7. A two-way asymmetric communication system having independently scalable upstream and downstream paths that enable remote data processor devices to communicate with a server, said system comprising:
   a common routing/switching backplane for providing intercommunication services among multiple communication devices including said server,
   an independent upstream controller in communication with said backplane operating in accordance with an upstream protocol for receiving information packets from said remote data processor devices, said upstream controller including network operating algorithms for analyzing response packets transmitted by said downstream controller to determine operational status of a first identified remote data processor device,
   an independent downstream controller in communication with said backplane for transmitting data packets to said remote data processor devices in accordance with a downstream protocol, said independent downstream controller being operative to transmit control packets directed to a first identified remote data processor device that instructs said device to respond with predetermined information in accordance with said control packet;
   a network manager in communication with said independent upstream and downstream controllers through said backplane for effecting management of two-way communications between said first remote data processor device and a second remote data processor device, and said server; and
   wherein said network manager effects configuration management of said remote devices by effecting issuance of control packets that perform at least one of: assigning an upstream response frequency; adjusting an upstream transmitter; assigning an IP address; assigning a local MAC address; assigning an upstream transmit data rate; effecting reporting of status; effecting a transmission of data by said remote processor devices; assigning a shared channel for use by said remote processor devices; and assigning a dedicated channel for use by said remote data processor device.

8. In an asymmetric network having respective upstream and downstream communication paths for enabling a plurality of remote devices to receive information from a host over a shared medium, the improvement comprising:
   plural downstream channels operating over said shared medium, and
   a network manager for providing bandwidth management of downstream bandwidth allocated to respective remote devices over said plural downstream channels;
   wherein said network manager further includes operative routines for detecting service requests for requested bandwidth, for assessing bandwidth utilization of respective downstream channels on said shared medium, and for assigning additional downstream bandwidth to remote devices in accordance with said utilization and service requests;
   wherein said remote devices include operative routines for determining and gathering statistical data relating to operating characteristics thereof and for reporting said statistical data to said network manager, and wherein said network manager utilizes said reported statistical data for allocating upstream channels to said remote devices.

9. An asymmetric network system including upstream and downstream channels and utilizing control and response packets for managing bandwidth and configuration parameters of multiple remote devices in communication with a host over a shared downstream medium, said network comprising:
   a first controller located at a head end of said asymmetric network system, to generate a configuration control packet that contains control information for effecting at least one of upstream channel assignment, transmit power level, address assignment, and data transmission credit level,
   a second controller located at the head end of said asymmetric network system to generate a bandwidth management control packet that effects allocation of bandwidth on said shared downstream medium to said remote devices, and a third controller located at at least one of said remote devices that responds to said configuration control packet by transmitting information on said upstream channel in accordance with at least one of said upstream channel assignment, transmit power level, address assignment and data transmission credit level.

10. The asymmetric network system as recited in claim 9 wherein said first controller generates said configuration control packet according to registration information provided by a network operator including IP address assignment and account administration information.

11. The asymmetric network system as recited in claim 9 wherein said first controller generates said configuration control packet for a given remote device according to available unused channels, channel usage by other remote devices, available upstream bandwidth, bandwidth guaranteed to other remote devices, channel usage, class of service of said given remote device and requested demand for bandwidth of said given remote device.

12. The asymmetric network system as recited in claim 9 wherein said downstream medium comprises a wireless broadcast medium.

13. The asymmetric network system as recited in claim 9 wherein said downstream medium comprises a telephony return upstream channel.

14. The asymmetric network system as recited in claim 9 wherein said downstream medium comprises an RF broadcast and said upstream channel is carried in an RF transmission.

15. A remote device for use in an asymmetric network communication system which includes at least one high-speed downstream channel operating over a shared medium, said remote device comprising:
    an RF interface for receiving high-speed data transmission over at least one of said downstream channels,
    a microprocessor controller for receiving control packets from a network management system, said control packets including control information for effecting control of at least one of upstream channel assignment, transmitter level, remote address assignment, and transmission credit value allocated to said remote device, and
    said microprocessor controller being responsive to said control packets to effect operation at said RF interface of at least one of said upstream channel assignment, transmit power level, remote address assignment and transmission credit value
    wherein said microprocessor controller applies error correction to information packets which are transmitted upstream to said network management system.

16. The remote device as recited in claim 15 wherein said microprocessor controller confirms the operation of said remote interface at least one of said upstream channel assignment, transmit power level, remote address assignment and transmission credit value by returning a response packet to said network management system confirming said operation.

17. The remote device as recited in claim 15 further including operative routines for gathering statistical operational data about said remote device, and for reporting said statistical operating data to said network management system.

18. The remote device as recited in claim 15 wherein said microprocessor controller receives network operating software downloaded from said network management system, said network operating software being used for interpreting control packets to effect operation of said remote interface.

19. The remote device as recited in claim 15 wherein said microprocessor controller unencapsulates said control packets in order to decipher the information content thereof.

20. The remote device as recited in claim 15 further including an upstream transmit power responsive to said microprocessor controller for transmitting upstream data packets to said network management system.

21. The remote device as recited in claim 15 further including a second RF interface for effecting the transfer of RF data signals in an upstream transmission to said network management system.

22. The remote device as recited in claim 15 further including a cable return interface for generating upstream information and response packets for transmission to said network management system.

23. The remote device as recited in claim 15 further including network operating software for use with a telephone return modem of a remote computer to effect transmission of upstream packets to said network management system.

\* \* \* \* \*